(12) United States Patent
Topiwala et al.

(10) Patent No.: US 10,650,590 B1
(45) Date of Patent: May 12, 2020

(54) METHOD AND SYSTEM FOR FULLY IMMERSIVE VIRTUAL REALITY

(71) Applicant: FastVDO LLC, Melbourne, FL (US)

(72) Inventors: Pankaj N. Topiwala, Cocoa Beach, FL (US); Wei Dai, Clarksville, MD (US); Madhu P. Krishnan, Melbourne, FL (US)

(73) Assignee: FASTVDO LLC, Melburne, FL (US)

( * ) Notice: Subject to any disclaimer, the term of this patent is extended or adjusted under 35 U.S.C. 154(b) by 316 days.

(21) Appl. No.: 15/698,410

(22) Filed: Sep. 7, 2017

Related U.S. Application Data

(60) Provisional application No. 62/384,532, filed on Sep. 7, 2016.

(51) Int. Cl.
*G06T 19/00* (2011.01)
*G06F 3/01* (2006.01)
*H04L 29/08* (2006.01)
*H04N 13/117* (2018.01)

(52) U.S. Cl.
CPC ............ *G06T 19/003* (2013.01); *G06F 3/013* (2013.01); *G06T 19/006* (2013.01); *H04L 29/08954* (2013.01); *H04N 13/117* (2018.05)

(58) Field of Classification Search
CPC ... G06T 19/003; G06T 19/006; H04N 13/117; G06F 3/013; H04L 29/08954
See application file for complete search history.

(56) References Cited

U.S. PATENT DOCUMENTS

| | | | |
|---|---|---|---|
| 8,155,462 | B2 | 4/2012 | Tran et al. |
| 8,428,135 | B2 | 4/2013 | Tourapis et al. |
| 8,520,736 | B2 | 8/2013 | Topiwala |
| RE44,743 | E | 2/2014 | Topiwala et al. |
| 8,913,660 | B2 | 12/2014 | Tourapis et al. |
| 9,524,028 | B2 | 12/2016 | Dai et al. |
| 9,609,336 | B2 | 3/2017 | Topiwala et al. |
| 10,027,888 | B1 * | 7/2018 | Mackraz ............ H04N 5/23238 |
| 10,397,543 | B2 * | 8/2019 | Cole |

(Continued)

OTHER PUBLICATIONS

Bross, B. et al., "Versatile Video Coding (Draft 6)", Joint Video Experts Team of ITU-T SG 16 WP3 and ISO/IEC JTC 1/SC 29/WG 11 JVETO2001-vE, Jul. 3-12, 2019, 455 pages.

(Continued)

*Primary Examiner* — Andrea N Long
(74) *Attorney, Agent, or Firm* — Fenwick & West LLP

(57) ABSTRACT

Methods and systems use a video sensor grid over an area, and extensive signal processing, to create a model-based view of reality. Grid-based synchronous capture, point cloud generation and refinement, morphology, polygonal tiling and surface representation, texture mapping, data compression, and system-level components for user-directed signal processing, is used to create, at user demand, a virtualized world, viewable from any location in an area, in any direction of gaze, at any time within an interval of capture. This data stream is transmitted for near-term network-based delivery, and 5G. Finally, that virtualized world, because it is inherently model-based, is integrated with augmentations (or deletions), creating a harmonized and photorealistic mix of real, and synthetic, worlds. This provides a fully immersive, mixed reality world, in which full interactivity, using gestures, is supported.

28 Claims, 32 Drawing Sheets

(56) References Cited

U.S. PATENT DOCUMENTS

| | | | |
|---|---|---|---|
| 2010/0026809 A1* | 2/2010 | Curry | H04N 5/222 348/157 |
| 2010/0251173 A1* | 9/2010 | Imanishi | H04N 7/17318 715/810 |
| 2012/0169842 A1* | 7/2012 | Chuang | G08B 13/19619 348/39 |
| 2013/0148861 A1* | 6/2013 | Ferlatte | G06K 9/00624 382/107 |
| 2014/0347263 A1 | 11/2014 | Dai et al. | |
| 2016/0037068 A1* | 2/2016 | Jenny | G11B 27/031 348/36 |
| 2017/0237964 A1* | 8/2017 | Maenpaa | H04N 13/332 348/39 |
| 2019/0255419 A1* | 8/2019 | Reilly | A63B 69/00 |

OTHER PUBLICATIONS

CNET, "Intel demos world's first Walk-around VR video experience," YouTube, Jan. 4, 2017, 1 page [Online] [Retrieved Aug. 27, 2019], Retrieved from the internet <URL: https://www.youtube.com/watch?v=DFobWjSYst4>.

Collet, A. et al., "High-Quality Streamable Free-Viewpoint Video," Siggrach, Aug. 2015, vol. 34, No. 4, 13 pages.

Hartley, R. et al., "Multiple View Geometry in Computer Vision," Cambridge Press, 2003, 673 pages.

Huang, J. et al, "6DoF VR Videos with a Single 360-Camera," IEEE 2017 VR Conference, Mar. 18-22, 2017, pp. 37-44.

International Telecommunication Union, "Series H: Audiovisual and Multimedia Systems, Infrastructure of audiovisual services—Coding of moving video: High efficiency video coding," ITU-T H-Series Recommendations, Feb. 2018, pp. 1-672.

ISO/IEC JTC 1/WC 29 N, "Information technology—High efficiency coding and media delivery in heterogenous environments—Part 3: 3D Audio," ISO/IEC, Apr. 4, 2014, 337 pages.

Lafruit, G. et al., "[MPEG-1 Visual] Next generation light field coding with view synthesis," International Organisation for Standardisation, ISO/IEC/ JTC1/SC29/WG11 MPEG2016/M40782, Jul. 2017, 12 pages.

U.S. Appl. No. 62/511,290, filed May 25, 2017, Inventor Topiwala, P. et al.

Wegner, K. et al. "EE: Evaluation of step-in/step-out capability of state-of-the-art view synthesis technology," International Organisation for Standardisation, IOS/IEC JTC1/SC29/WG11 MPEG2017/M40809, Jul. 2017, 4 pages.

Wegner, K. et al., "Depth based view blending in View Synthesis References Software (VSRS)," International Organisation for Standardisation, ISO/IEC JTC1/SC29/WG11 MPEG2015/M37232, Oct. 2015, 5 pages.

Yu, M. et al., "A Framework to Evaluate Omnidirectional Video Coding Schemes," 2015 IEEE International Symposium on Mixed and Augmented Reality, 2015, pp. 31-36.

* cited by examiner

CHANGE OF VIEW. OBJECTS/SCENES ENTER/EXIT VIEW, BUT BARREL MUCH THE SAME.

METHOD AND SYSTEM FOR FULLY IMMERSIVE VIRTUAL REALITY

CROSS-REFERENCE TO RELATED APPLICATION

This application claims priority under 35 U.S.C. § 119(e) from U.S. Provisional Patent Application, Ser. No. 62/384,532, entitled "Method and System for Fully Immersive Virtual Reality" filed on Sep. 7, 2016, which is incorporated by reference herein in its entirety.

FIELD OF THE INVENTION

This invention relates to the fields of computer animation, virtual reality, augmented reality, and mixed reality. It further relates to immersive experiences, and 360-degree perspectives. Finally, it specifically relates to virtual, augmented, and mixed reality with six degrees of freedom (6DoF).

BACKGROUND OF THE INVENTION

Virtual reality comprises computer-generated simulation of a 3D images or environment that can be interacted with in a seemingly real or physical way by a person using special electronic equipment, such as a helmet with a screen inside. The fields of virtual reality, augmented reality, and mixed reality have become very popular recently, with considerable interest in 360-degree virtual reality experiences. In this system, a 360-degree video is captured from a single location in space. A video is generated and provided to a user. Since what is seen is real, this is a significant step forward from a single viewpoint, as presented in today's video experience, in that it allows a first-level of interactivity—a 360-degree view. This provides 3 degrees of freedom (3DoF), namely one can rotate the view along any of the three axes, at one point. But the viewer is still stuck in one place. Similarly, video games offer full immersion (6DoF), but with modest realism. And in another dimension, CGI based films offer a very high level of realism—but tell a linear story, without any user control or navigability. Thus, conventional technology lacks the ability to offer a true 6DoF immersive experience.

Configuration Overview

Embodiments of the invention address the shortcomings of the prior art, as mentioned. This is a complex systems integration problem, with key bottlenecks in computation, storage, and timely delivery, but also one where most component technologies are actually at hand.

Deployment of an array of a plurality of sensors, each acquiring 360-degree video plus depth or range data. The sensors may be genlocked. In some embodiments, stereo 2D vision is used. The array of sensors can be anything from a single video sensor, to a 2D grid, to even a 3D grid (e.g., a formation of drone sensors). The sensors and/or the scene may change with time. But for convenience of discussion only, the disclosure here uses figures and text indicative of a fixed array, and over a 2D area. Such language is not limiting to our invention, which applies generally. Furthermore, an array of sound sensors at each grid point provides a rich 3D audio field as well. Other types of sensors, related to other senses, may also be deployed, such as haptic sensors. Each sensor is positioned on a distinct location within a geographical area. For example, if the virtual reality experience displays a stadium, the sensors may be distributed across the geographical area of the stadium and each sensor positioned within a distinct location in the stadium. A server stores information describing each sensor from the sensor array including position of each sensor, information identifying the sensor, and metadata describing the sensor. The server is configured to receive data from each sensor including 360-degree video, depth/range data, and additionally may have audio data. A 360-degree video is also referred to herein as a 360 video. A server may correspond to a server farm that includes several processors.

A user, watching a screen or wearing a virtual reality device such as a headset (and perhaps gloves and other sensory receptors), is presented with an area of terrain to visually (and sensorially) explore, as in a video game. The device used by the user to interact with the virtual reality is also referred to as a client device or a client receiver. In addition, a set of internal or external sensors track the user's position and movement, especially the head, arms, and hands, as well as his/her direction of gaze. The client device determines a set of coordinates identifying a user location and a view angle of the user corresponding to a gaze of a user. The user location represents a virtual location of the user in the geographical area and the viewing angle represents a virtual viewing angle of the user in the geographical area. In the above example, the user may be physically situated in his living room but have a virtual location in the stadium that he is interacting with via virtual reality. Accordingly, the client device determines a virtual location and a virtual viewing angle of the user in the geographical region (the stadium). The user may be able to move within the virtual geographical area. Accordingly, the client device may continuously update the virtual user location and the virtual viewing angle. The virtual location of the user is also referred to as the user location and the virtual viewing angle of the user referred to as the viewing angle of the user. The client device periodically sends the current user location and the current viewing angle of the user to the server. Accordingly, the server receives the current user location and the current viewing angle of the user from the client device.

The server determines a video or data for constructing a video corresponding to the user location and viewing angle and sends to the client device. If the client device had unlimited computational power, the client device could receive all the 360 videos and audio captured by each of the sensor in the sensor array and process it to build the video for displaying to the user. The amount of data represented by the 360 videos and audio of a large sensor array would be beyond the transmission capability of broadly available current networks, and likely those available in the near future. Moreover, not all views are needed to create a given user view. Therefore, the server determines a subset of data that is relevant for constructing the video that needs to be displayed on the client device, given the user location and the viewing angle. In one embodiment, the sensor array data is stored in memory or in a random access media, directly accessible to the receiver.

In an embodiment, the server selects a subset of sensors from the plurality of sensors based on a measure of distance of each sensor from the received user location. For example, the server selects the sensors that are closest to the user location and excluded sensors that are more than a threshold distance from the user location. In an embodiment, the server ranks the sensors based on their distance from the user location and selects the top-ranking sensors that are closest to the user location. The server identifies the 360 videos of each of the selected subset of sensors. The server extracts a portion of the 360-degree video from each of the identified 360 video. In an embodiment, the portion of video extracted from the 360 video is determined based on the view angle of the user. For example, the portion of video extracted from the 360-degree video represents a portion of the 360-degree video that is within a threshold angle from the viewing angle of the user, for example, 90 degrees on each side of the viewing angle representing a total span of 180 degrees. The server synthesizes a viewport representing a video from the point of view of the location of the user in the direction of the gaze of the user from the extracted portions of the identified 360-degree videos. In an embodiment, the server synthesizes the viewport based on techniques comprising: depth/range processing, point cloud generation, mesh generation, and texture mapping. The server sends the synthesized viewport to the client device of the user. The client device displays the video to the user via a display of the client device.

In an embodiment the server receives one or both of an updated user location and viewing angle and recomputes the viewport based on the updated user location and/or the viewing angle and sends the recomputed viewport to the client device. The server may receive the updated user location and/or viewing angle periodically, for example, every few milliseconds and repeats the above computation for determining the viewport and sending the viewport to the client device.

Signal processing, preferably at an intermediate server farm, with the sensor array videos and audios in the grid, is employed to detect objects, segment them, and develop their time-based histories in three-dimensional space. Objects are represented as point clouds, then mesh surfaces at each instant in time (and from each perspective), while the raw videos provide material for textures to overlay on the mesh. To a significant extent, the real world is modeled as a textured mesh at each instant in time, in a direct analogy to the virtual world of video games. This allows final integration of the real and synthetic worlds, if desired. It also allows rapid, real-time rendering.

These individual systems point clouds, meshes, and textures are smoothed, and multi-tracked within the sensor system, and a coherent perspective (sight and sound) is developed for the viewable scene, in binocular vision, according to the position and direction of gaze of the user ("view") at any given time. This is again fully analogous to video games, in which the viewable scene is rendered in real-time (in this case from stored models of the virtual world). We will call this Scene-To-Model representation (S2M). From the model, the desired scene is then rendered (the entire system is S2M2R).

It should be noted that a three-dimensional sense of the audio world is an important part of the immersive experience. In fact, the technology for representing 3D audio is actually more advanced at the present time then 3D video. This patent aims to advance the state of the art of 3D video, while incorporating the advances in 3D audio. We note that the technology for representing and transmitting 3D audio has achieved a level of maturity currently unavailable in video to date. Embodiments use standards in audio, in particular ISO/IEC 23008-3 (MPEG-H, part 3, "3D Audio"). The disclosure focuses on the video elements, but count in audio integration. For video coding, embodiments use the current state-of-the-art video codec, ITU|ISO/IEC H.265/HEVC standard or other codecs such as AV1 from the Alliance for Open Media (aomedia.org), as well as upcoming codecs such as ITU|ISO/IEC H.266/JVET.

Embodiments insert additional "artificial" or "external" objects in the S2M representation (or delete or change existing ones). Thus, the S2M representation is used to synthesize both a real and a virtual world, and blend them together. Certain computer generated imagery (CGI) used in modern movies perform video editing geared towards a fixed, deterministic event history. As an example, the 2016 Disney release of Jungle Book was shot entirely in a studio, but recreates an exotic forest inhabited with English-speaking creatures. In contrast, embodiments allow addition of external objects in a fully 3D immersive way, on-demand and at user will.

In addition, individual objects within the scene may carry further sensory information, such as touch, smell, or even taste, whose signals are carried as auxiliary data. The reception and interaction with these sensory experiences depends on the user having corresponding sensory receptors.

The user may interact with this virtual world using hands and arms, and possibly by touch and other senses. In particular, movements and shapes of the hands and arms are interpreted as gestures, and are recognized using gesture recognition.

The user is thus presented with a rich stereoscopic vision into a virtual world, from any position and in any direction, on a given timeline. In addition, the user may also be presented with senses of touch, smell, and even taste, with the ongoing development of sensors and receptors in these cutting-edge fields (touch—or haptics—is especially well developed to integrate in this sensor experience at the current time).

BRIEF DESCRIPTION OF THE FIGURES

What is missing in the prior art (today's approach to virtual reality, with 3DoF) is the ability to move in the virtual environment, as a user can in a video game. Conversely, what is lacking in video games, which do offer true immersion, is true realism (although games are becoming increasingly realistic, with maturing realism being a key design objective). Finally, movies, with their massive budgets, are able to achieve very high levels of realism, but can tell only a linear story, with no actual control or navigability, and thus no actual immersion. Thus, conventional technology does not provide six-degrees-of-freedom (6DoF) in a real or mixed world. Because we seek to move in space, in x-y-z, in addition to being able to rotate along x-y-z, this would a crucial additional three degrees of freedom beyond the video sphere to achieve 6DoF. The potential availability of such an expansion of the breadth of interactivity possible in such a virtual world adds an unparalleled sense of immersion. The six degrees of freedom of a body allow a body to change position as forward/backward (surge), up/down (heave), left/right (sway) translation in three perpendicular axes, and changes in orientation through rotation about three perpendicular axes, often termed yaw (normal axis), pitch (lateral axis), and roll (longitudinal axis).

What started out as simple panoramas created on a smartphone, evolved into photospheres that can be viewed on a computer, and eventually went on to video spheres (360-degree videos) stitched together from multiple video sensor views from a sensor ball. This is the current state of virtual reality, based on actual reality, and it is already in use in publishing. As an example, online newspapers contain video spheres to emphasize a kind of telepresence at a remote location. But to really get a feel for a place or an event, one wants to be able to not only look around, but walk around—one really wants a fully immersive six-degrees-offreedom experience. This invention aims to provide a method and system for accomplishing that, using a video sensor grid over an area, and extensive signal processing, to create a model-based view of reality.

Our method and system use existing component technologies of grid-based synchronous capture, point cloud generation and refinement, morphology, polygonal tiling and surface representation, texture mapping, and data compression, but innovative system-level components for user-directed signal processing, to create, at user demand, a virtualized world, viewable from any location in an area, in any direction of gaze, at any time within an interval of capture. Moreover, this data stream can be transmitted at realistic data rates for near-term network-based delivery, and certainly 5G. Finally, that virtualized world, because it is inherently model-based, can be completely integrated with augmentations (or deletions), creating a harmonized and photorealistic mix of real, and synthetic, worlds. A fully immersive, mixed reality world, in which full interactivity, using gestures, is furthermore enabled, leading to unprecedented capabilities.

Figure 1A:
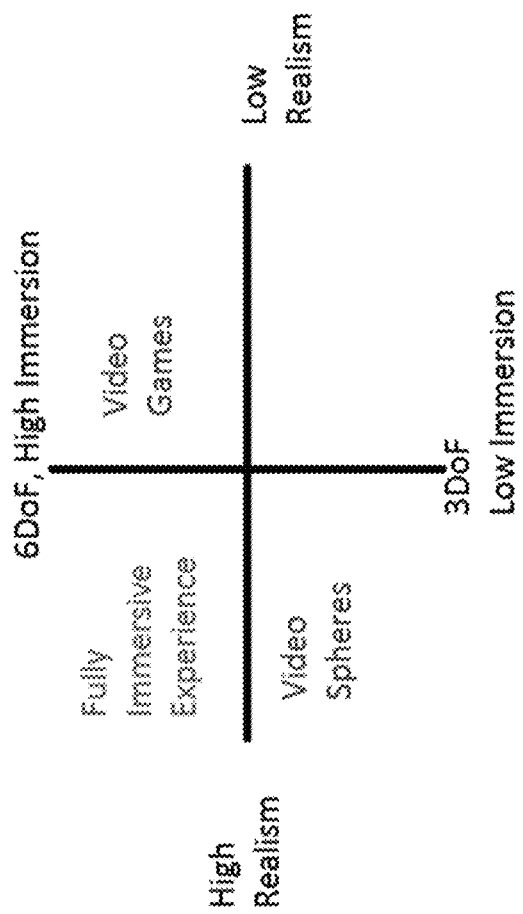

FIG. 1A shows the fundamental axes of a fully immersive experience (immersion vs realism). Currently, video games provide powerful immersion (6DoF), but at a low to moderate level of realism (improving with time). Meanwhile, 360-degree videos captured from the real environment provide a high degree of realism, although at a low level of immersion (3DoF). The aim of this invention is a synthesis to achieve both high realism and high (full) immersion, in both video and audio.

Figure 1B:

FIG. 1B depicts a scene from a recent video game (F1 2017), showing the high immersion (6DoF) and increasing realism available in modern video games. However, despite advances, it is still easy to tell the scene is not real.

Figure 1C:
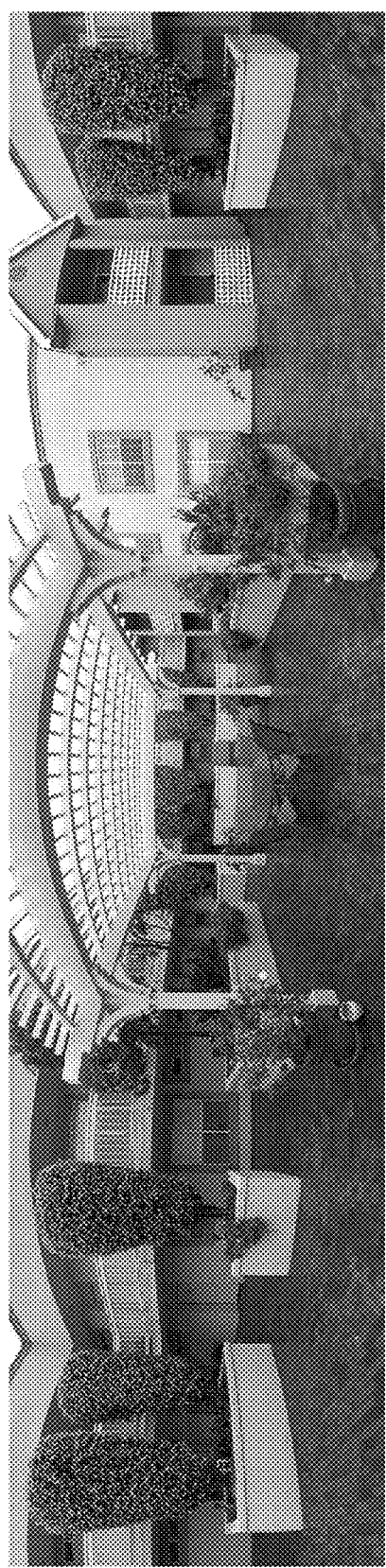

FIG. 1C shows a portion of an equirectangular projection (ERP) of a 360-degree video. Since the data is acquired from the real world (in relatively high resolution and quality), it achieves high realism, but a low level of immersion (3DoF).

Figure 1D:

FIG. 1D depicts a scene from the 2012 film, Life of Pi, in which a digitally generated tiger plays an integral role in an otherwise live action film.

Figure 1E:

FIG. 1E shows the merging of digital and real imagery, as four real tigers were also used in the filming, providing data to superimpose on the digital models.

Figure 1F:
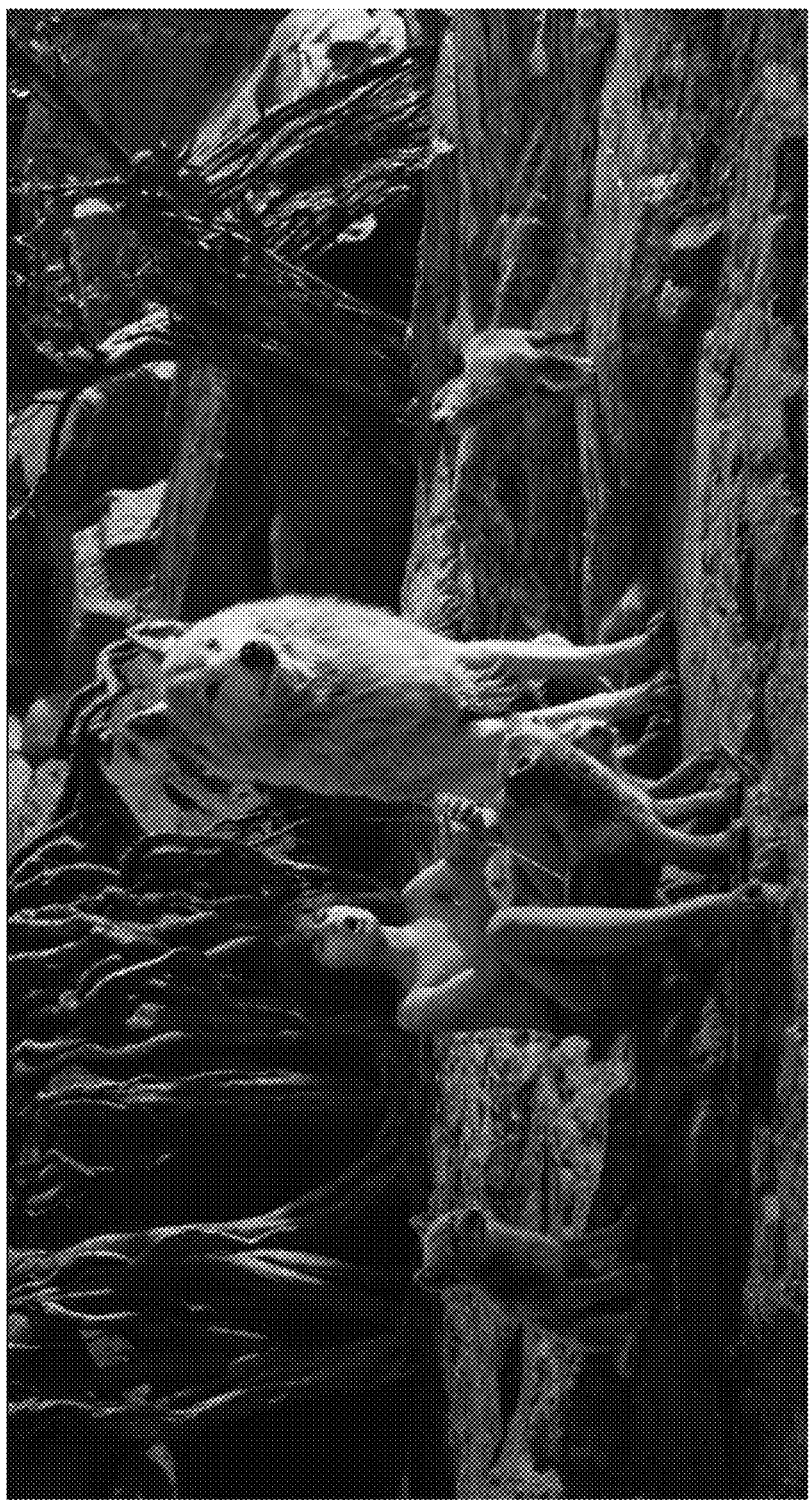

FIG. 1F shows a scene from 2016 movie, Jungle Book, in which a single human character (Mowgli) is blended into an otherwise digitally created world.

Figure 1G:

FIG. 1G depicts a scene from the 2009 film, Avatar, one of the most advanced uses of CGI in films; some scenes took 30 hours/frame to render in a server farm, according to director David Cameron.

Figure 2A:

FIG. 2A shows an example pair of recent 360 sensor balls by Facebook, with 24 and 6 sensors, respectively.

Figure 2B:
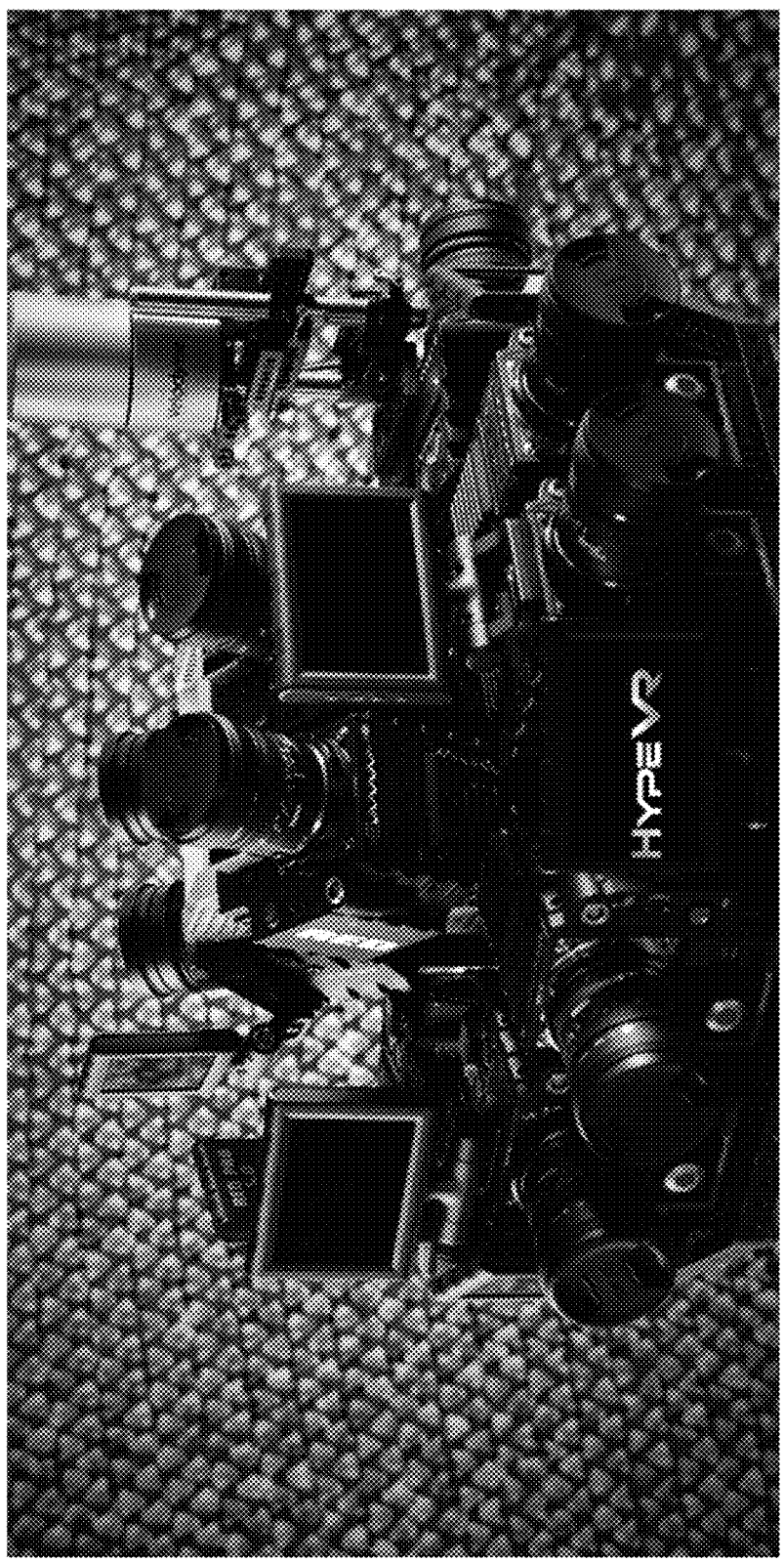

FIG. 2B shows a complicated sensor rig developed by Intel/HypeVR, sporting 12 Red Pro 5.0 cameras (these hi-res 2D cameras are deployed in stereo mode), and a Velodyne HDL-32E Lidar sensor. Note that stereo vision, along with the lidar, are used to determine depth/range. This is a high-cost, unique system, which cannot scale in today's technology.

Figure 2C:
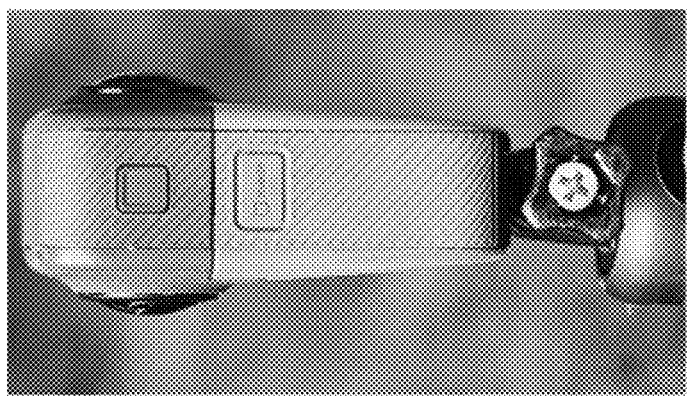
Figure 2C:
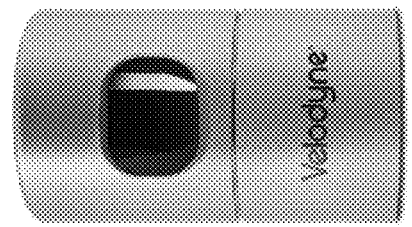
Figure 2C:
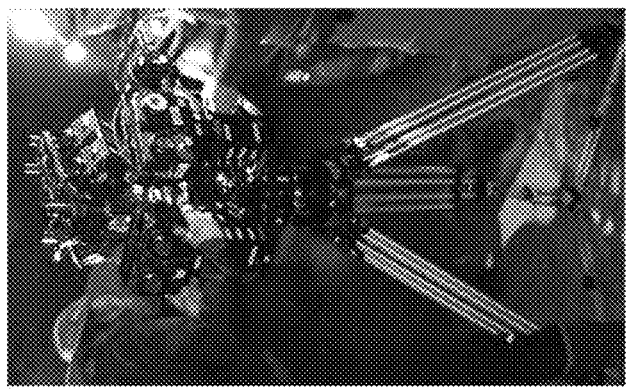
Figure 2C:
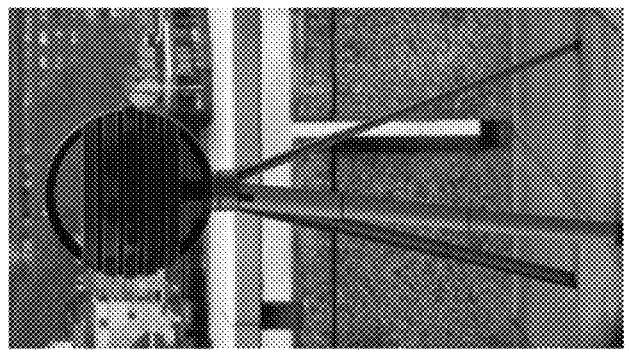

FIG. 2C shows rigs by Lytro and HypeVR, along with the Velodyne Lidar used by HypeVR, and also for driverless automotive applications. Also shown is a new low-cost consumer-level 360-degree video sensor, Fusion, from GoPro (targeted at about $500).

Figure 2D:
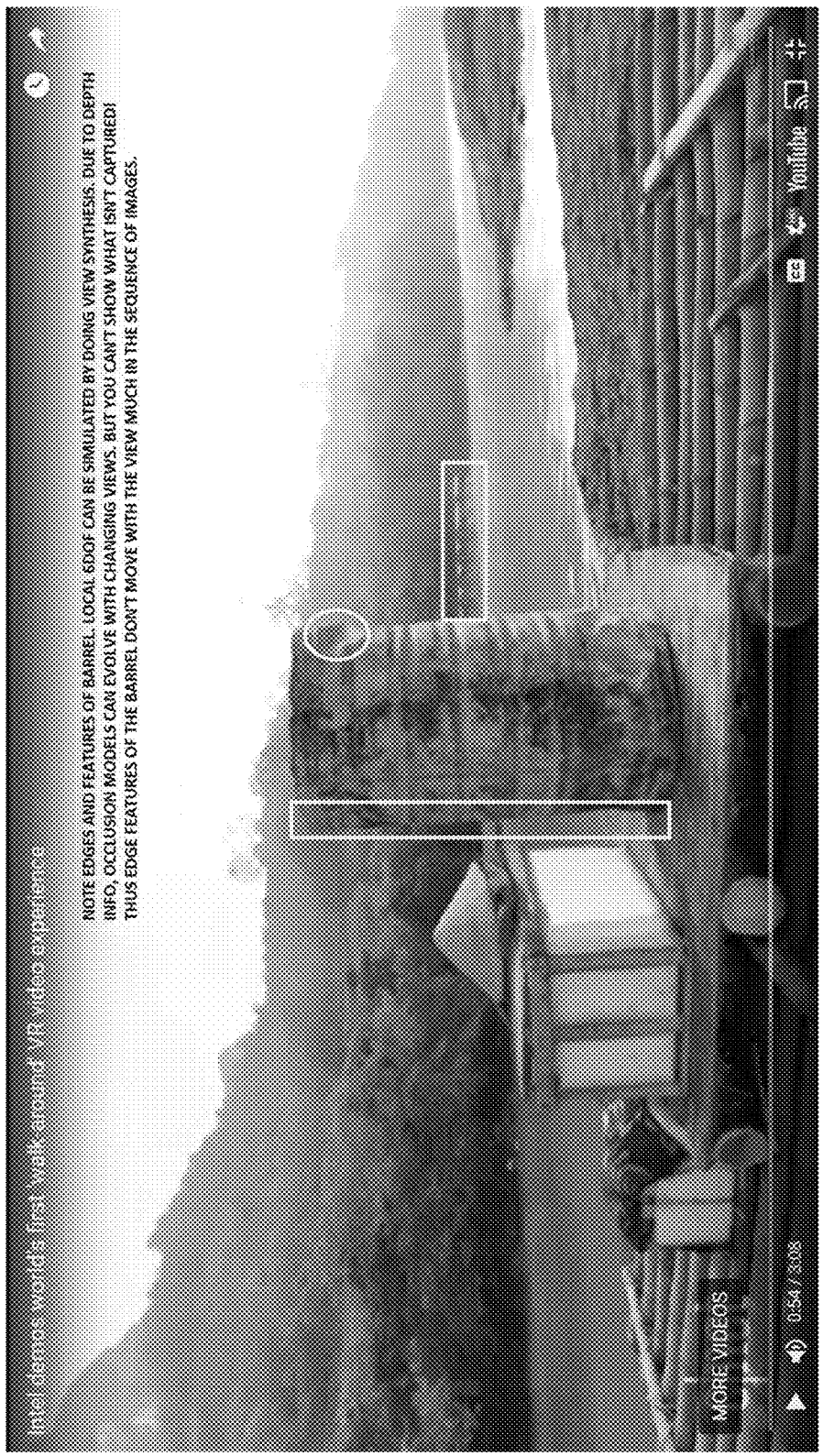

FIG. 2D shows an example frame from a purported 6DoF demo by Intel/HypeVR at the 2017 Consumer Electronics Show, January, 2017, at Las Vegas. The data was acquired from a single location, using the HypeVR sensor rig (FIG. 2A). Note the highlighted areas for tracking in subsequent frames.

Figure 2E:
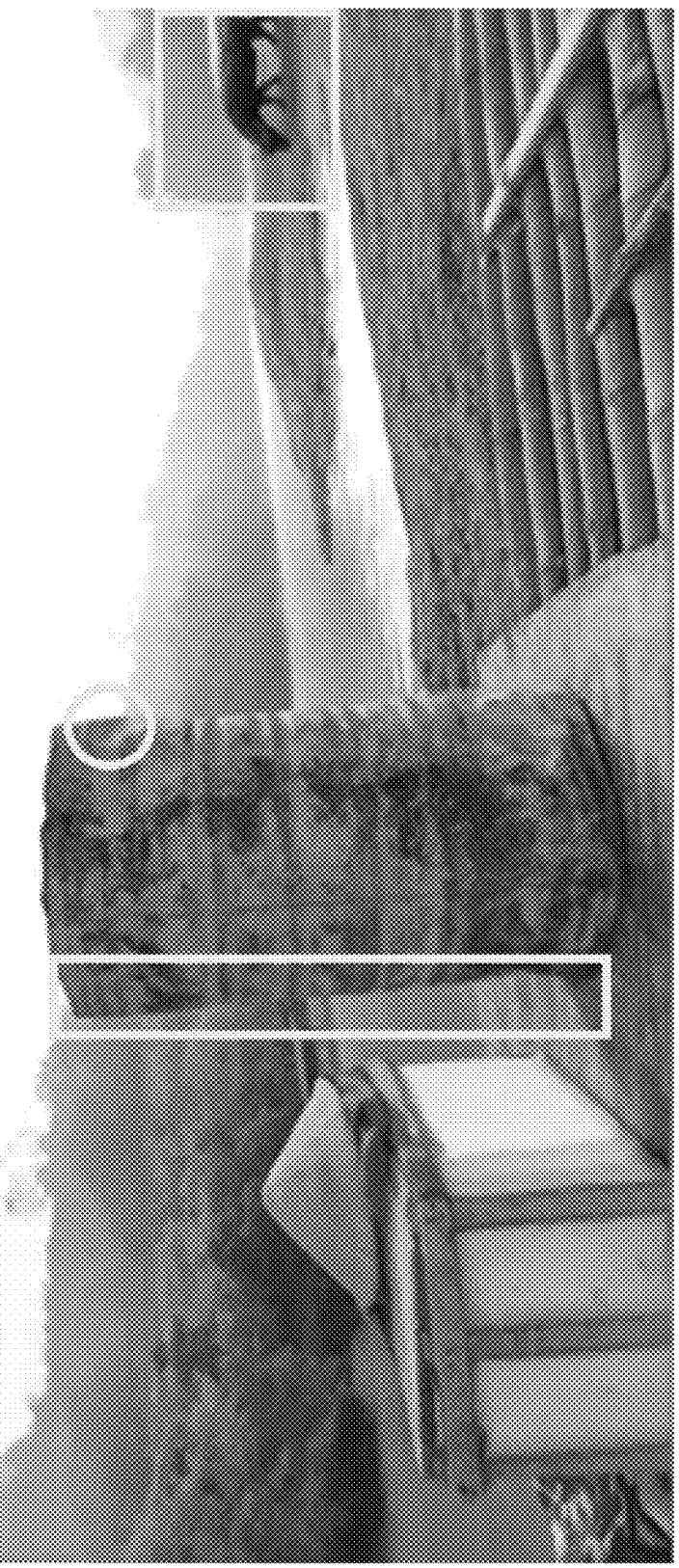

FIG. 2E shows another frame from the Intel/HypeVR 6DoF demo. Note that with the change of viewpoint, the background has changed, including what occlusion; however, the foreground appears to have changed somewhat less than expected. Sensing from a single location, with very high-resolution video and range data (as with their rig), can allow creating high quality 3D representations, that can allow some degree of mobility in the scene—something Intel calls 6DoF, but we call Local 6DoF. The fact is that what is not sensed can't really be represented. (What you see is what you get.)

Figure 2F:

FIG. 2F shows yet another frame from the Intel/HypeVR demo, showing both the power and limitations of this approach.

Figure 3A:

FIG. 3A depicts the limited (circular) capture stage in the Microsoft HoloLens setup, surrounded by sensor rigs with sensors (image credit Microsoft Corp.) In contrast to the 360-video sensor ball which is outward-looking, this setup is inward-looking. This is another unique, and high-cost experimental sensor system, which cannot easily scale.

Figure 3B:
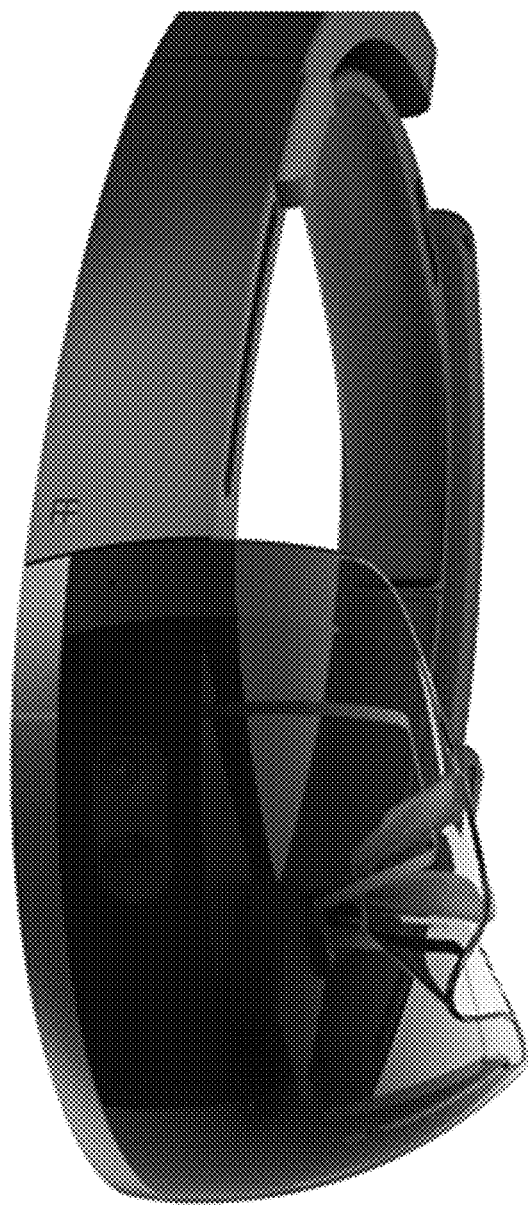

FIG. 3B shows the Microsoft HoloLens AR headset. We note that it integrates the Unity video game engine for rendering.

Figure 3C:
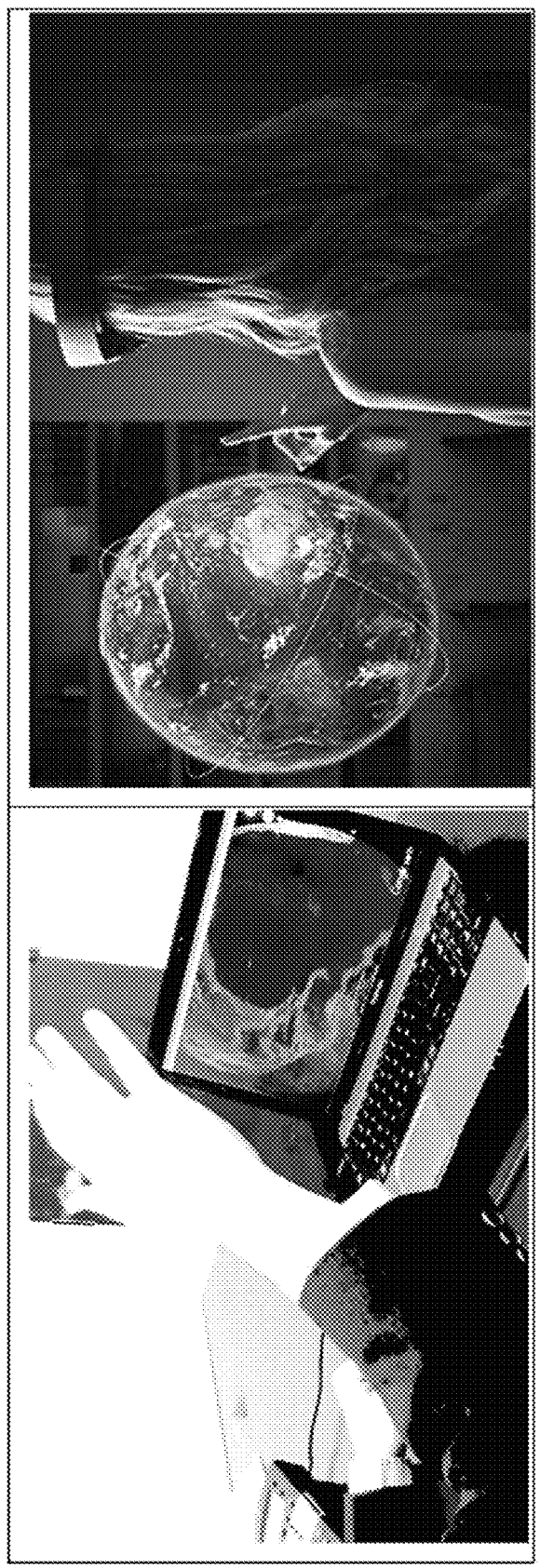

FIG. 3C shows gesture-based interaction with a virtual world: (a) a FastVDO laptop application; (b) a Microsoft HoloLens application (image credit Microsoft Corp.).

Figure 3D:
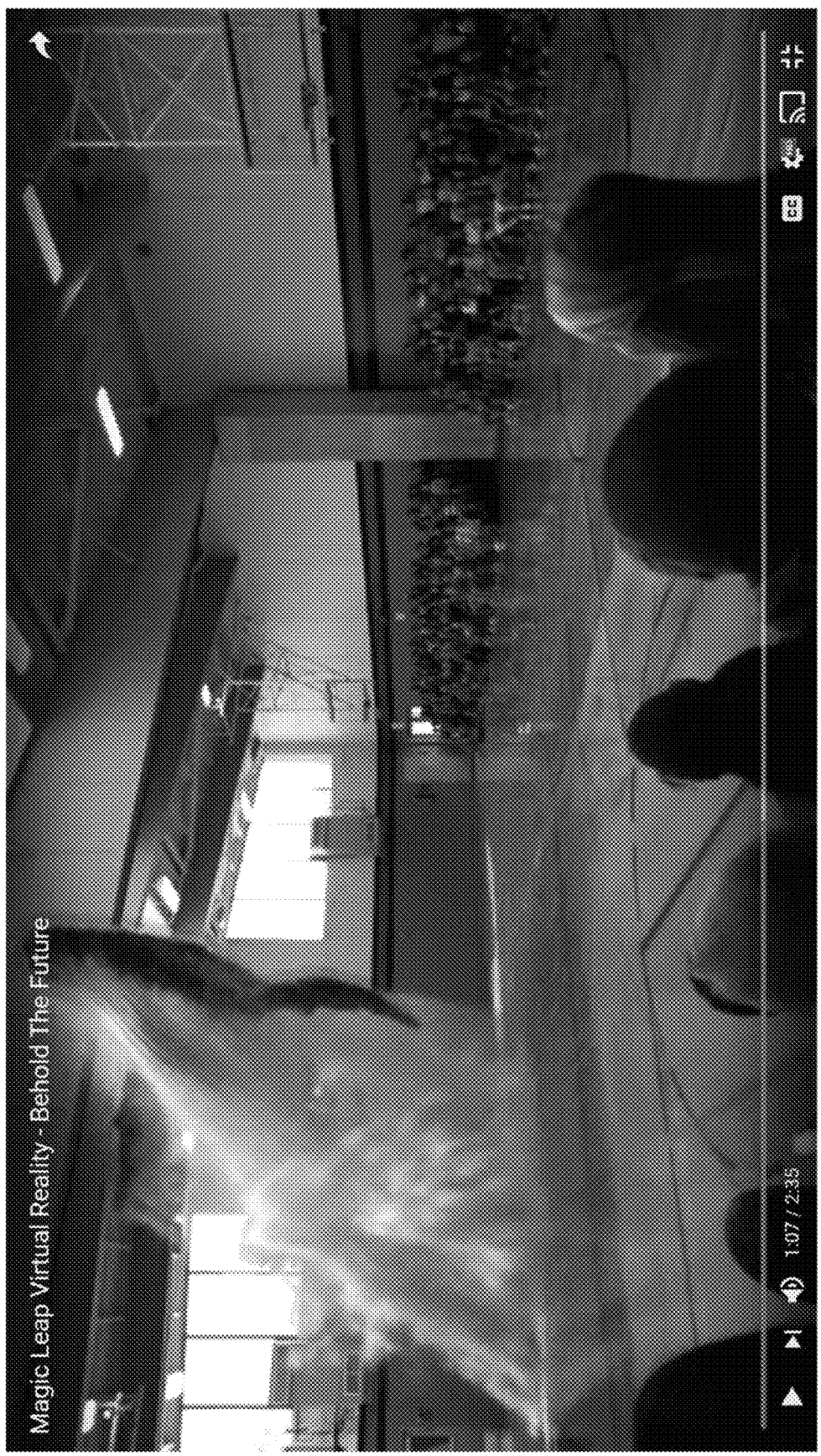

FIG. 3D shows a purported demo of augmented reality technology from the company MagicLeap. Their technology is an AR headset, but this demo contains no headsets.

Figure 4A:
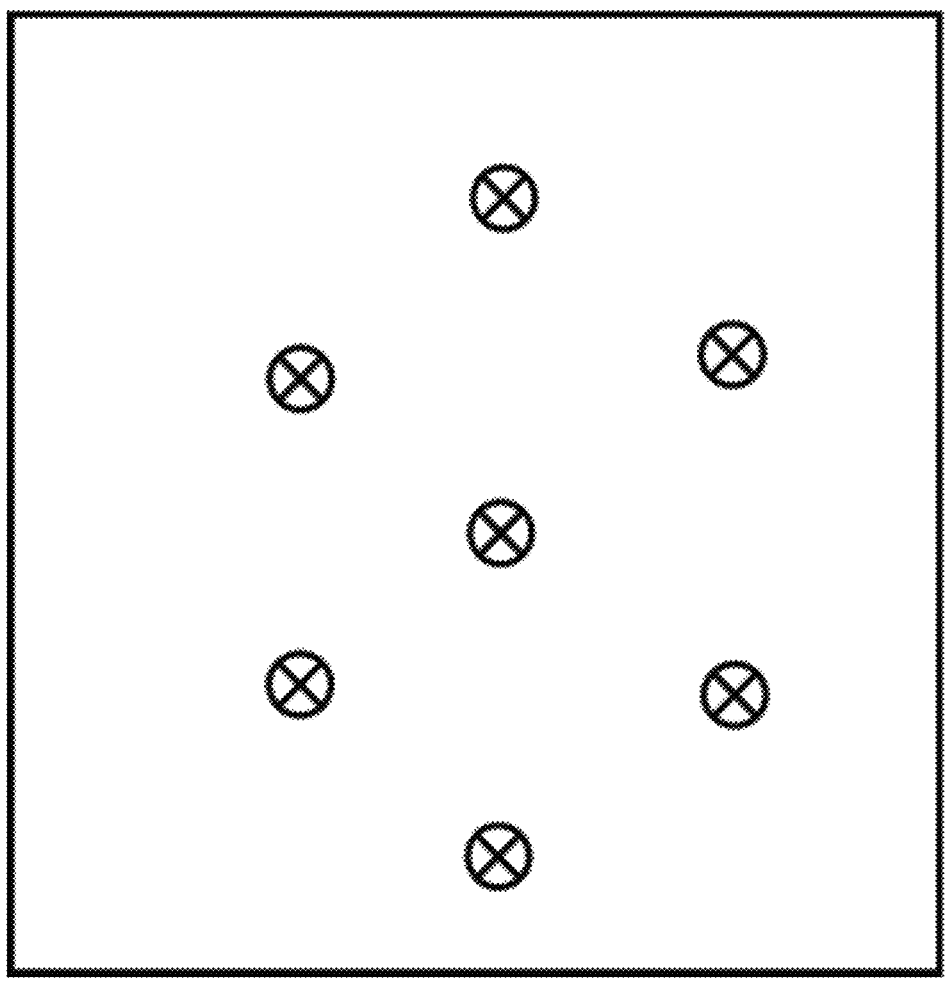

FIG. 4A depicts systems integration according to an embodiment, with a layout of 360-degree video sensors, and/or stereo 2D sensors, along with depth/range sensors such as IR/lidar, on a triangular grid. From this data, the goal is to synthesize the view from an arbitrary location within the grid, and an arbitrary gazing direction (view).

Figure 4B:
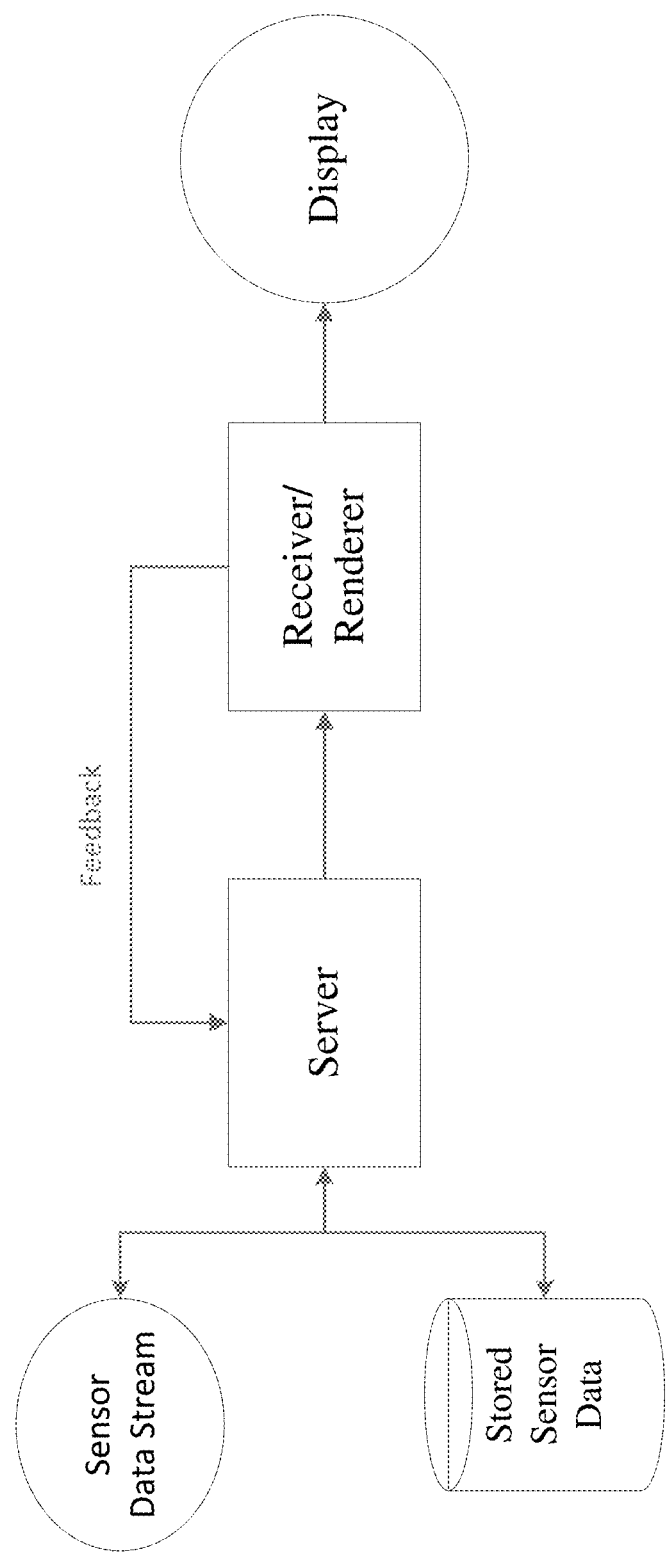

FIG. 4B depicts the client-server architecture of the 6DoF virtual reality system. User view data is sent periodically to server to request viewport. Timeliness and quality of service (QoS) are also measured at receiver and sent to server.

Figure 4C:
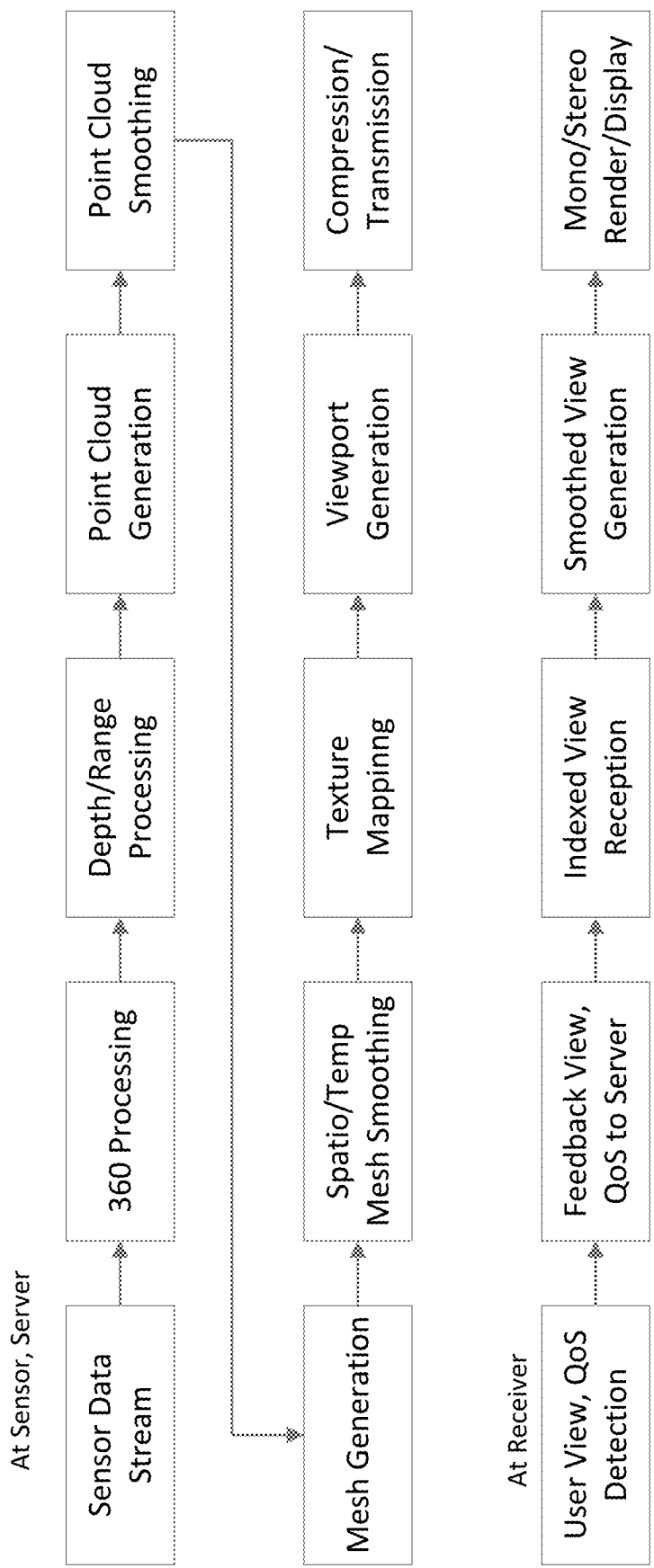

FIG. 4C depicts one embodiment of the invention, in which the viewport is generated at a server prior to transmission; in other embodiments, the point cloud, and/or mesh/texture, is transmitted, or stored locally, and the viewport generated at receiver. The viewport itself is a video. This method of representation is called the Point cloud-Mesh-Texture (PMT) Method, or PMTS, with view synthesis included. The figure depicts the inventive flow diagram for fully immersive reality. This is an example of a Scene-to-Model method.

Figure 4D:
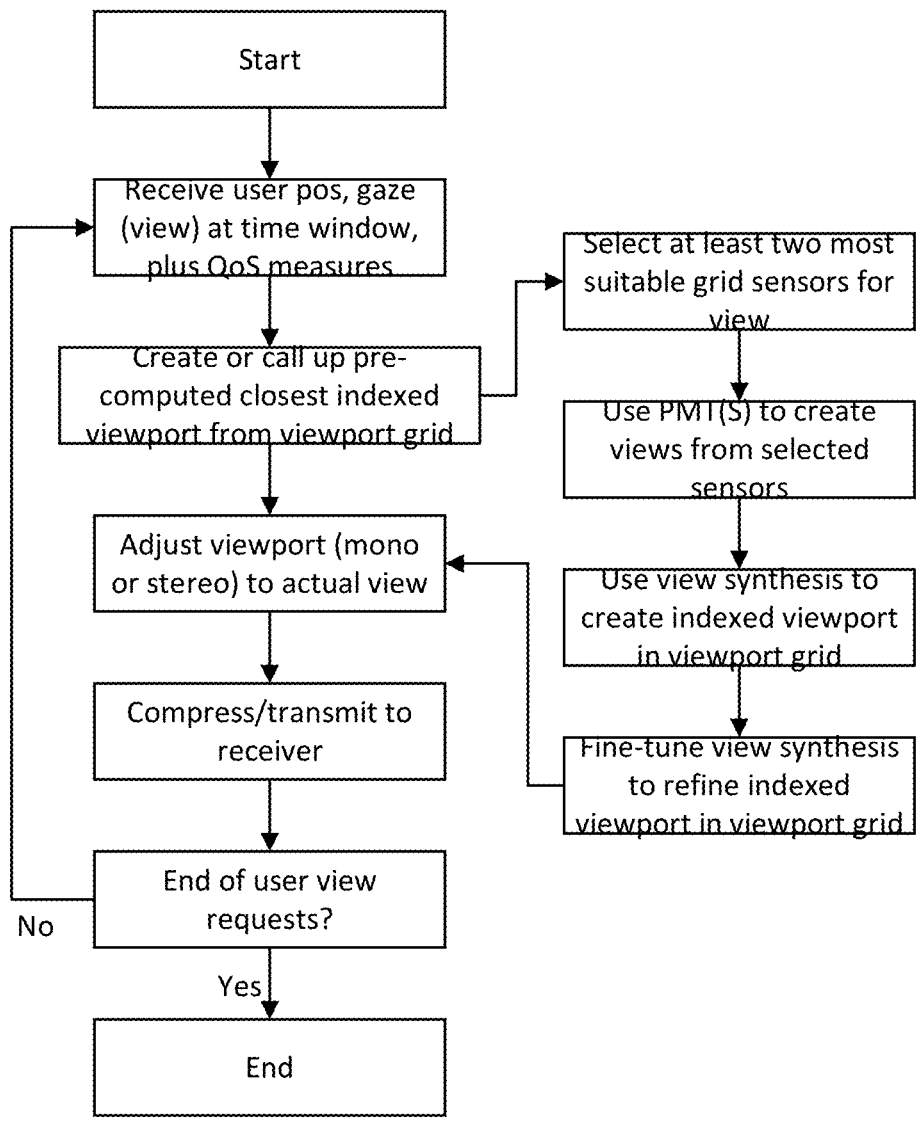

FIG. 4D depicts the server side methodology for creating a user desired viewport, starting from the data acquired from the sensor grid.

Figure 4E:
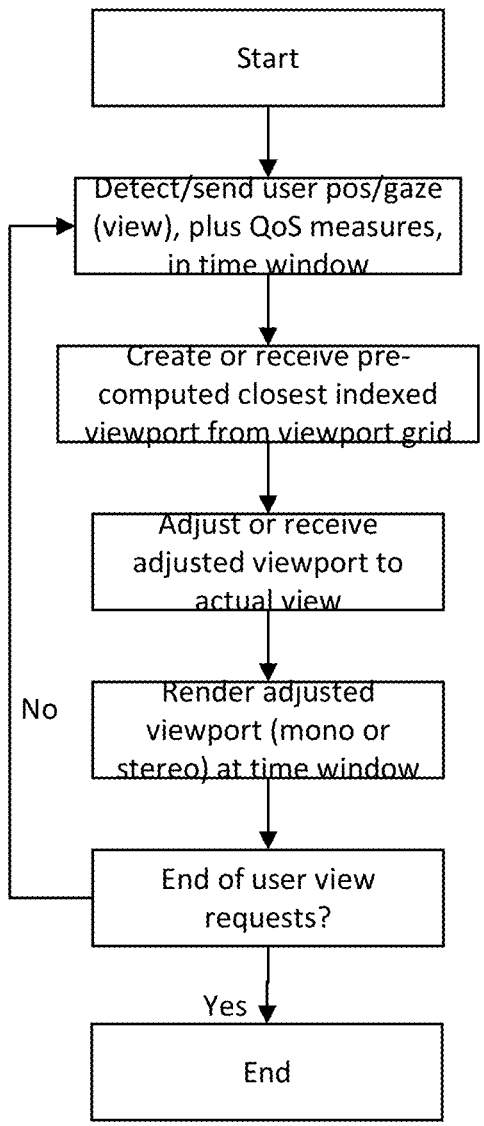

FIG. 4E depicts the receiver side methodology for creating a user desired viewport, starting from the data acquired from the sensor grid.

Figure 5:
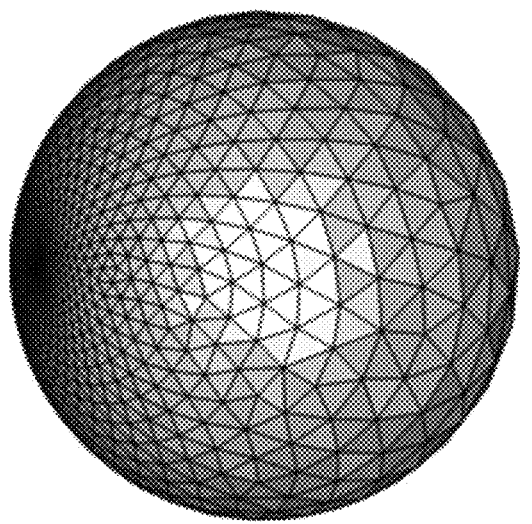
Figure 5:
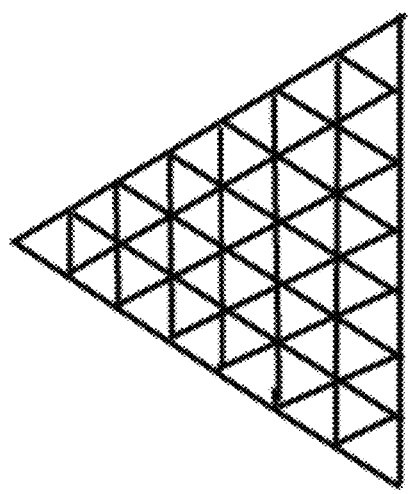
Figure 5:
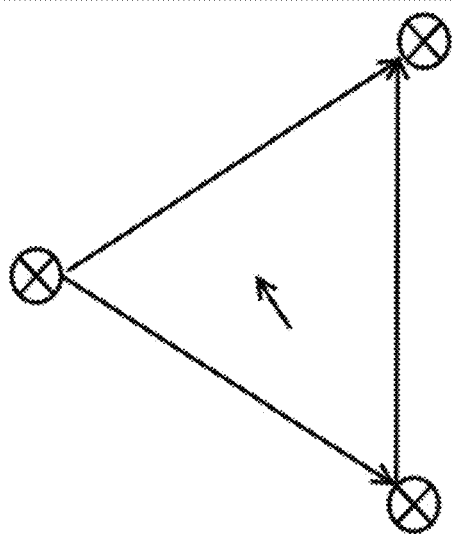

FIG. 5 depicts the basic inventive sensor and viewport triangulation setup. (a) A basic sensor triangle with an example viewport. (b) This subfigure serves two purposes. A grid of sensor triangles spans the area. This fundamental unit is repeatable over an unlimited area by triangulations. And within a sensor triangle, the viewport position (base of arrow) is discretized into sub triangles. (c) Similarly, the viewport orientation in latitude-longitude (arrow direction)

is discretized into triangles in the sphere. Due to attention models of typical viewers, we mainly focus at and near the equator. These discretized set of viewports can be precomputed and be available at the server. But at the receiver, a small set of indexed viewports are blended for a final smooth rendering of the actual viewport, based on nearby available viewports (and led by those obtained by nearest sensor grid points).

Figure 6:
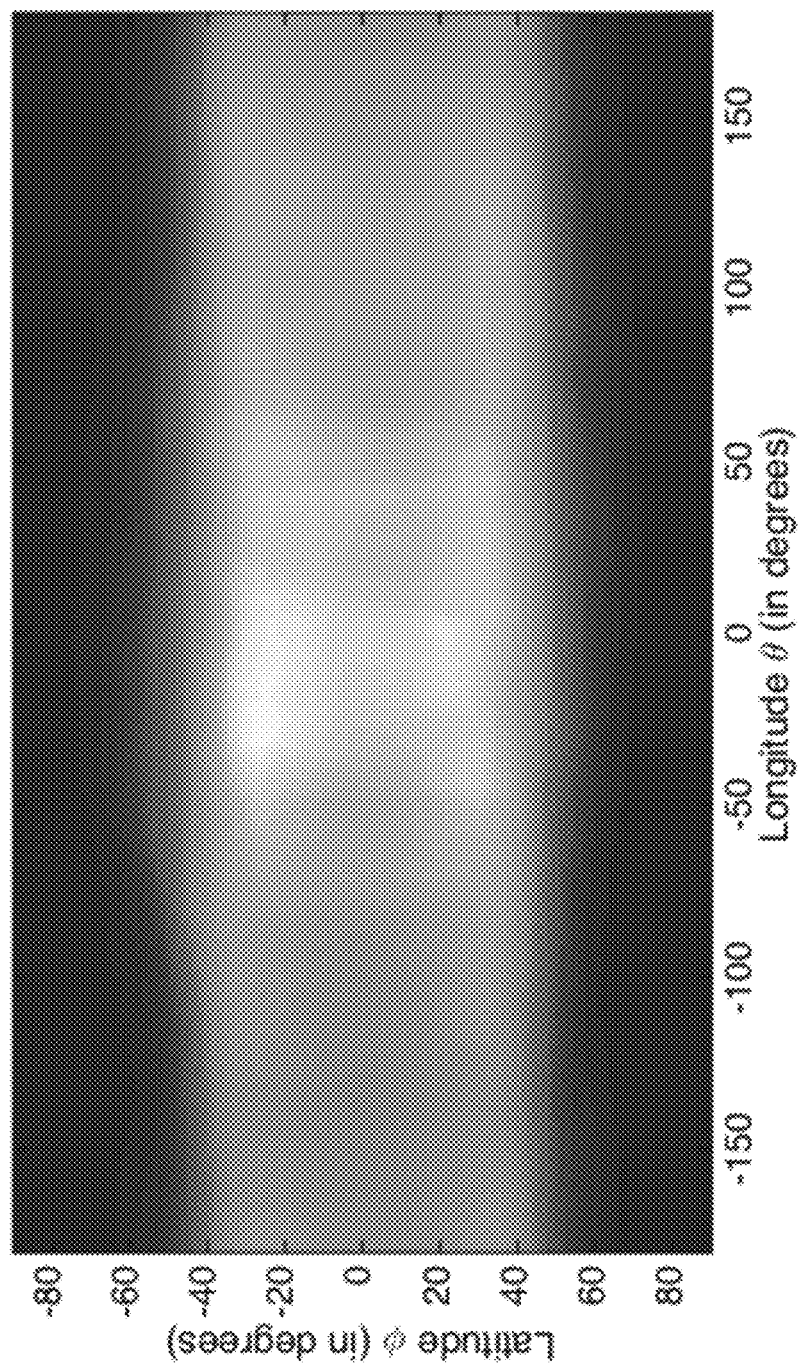

FIG. 6 depicts the typical attention model in viewing 360-degree videos. It shows the frequency of access of coordinate data by virtual reality subjective testers, in effect creating a typical use and attention weighting model, with high attention in yellow (or light), and low attention in blue (or dark). Note that as may be expected, attention tends to be focused front and center.

Figure 7A:
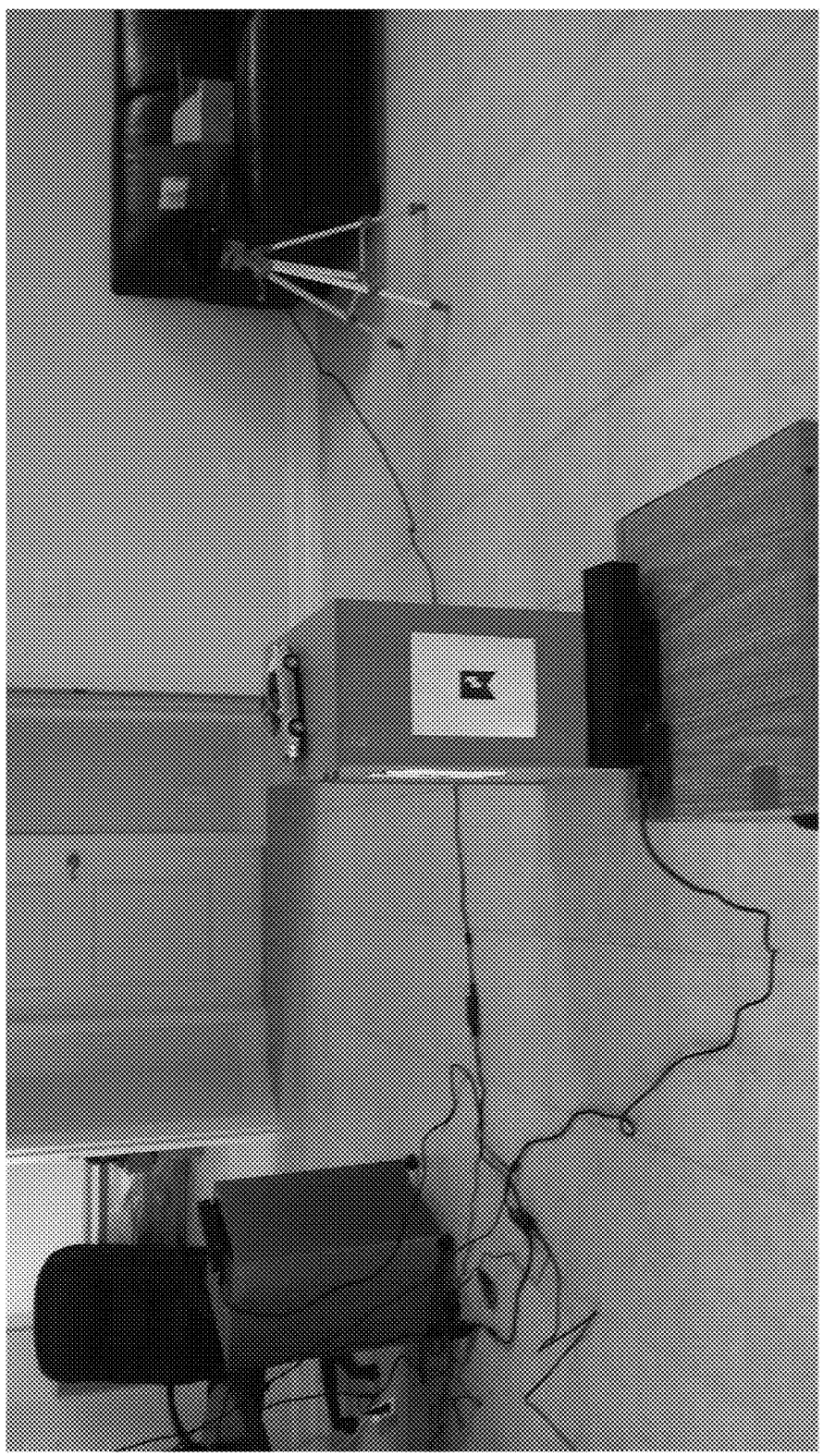

FIG. 7A depicts the test, low-cost, scalable FastVDO system with 3 Kinect v2 sensors. Upcoming enhanced version of this technology can potentially enable consumer VR/AR applications.

Figure 7B:
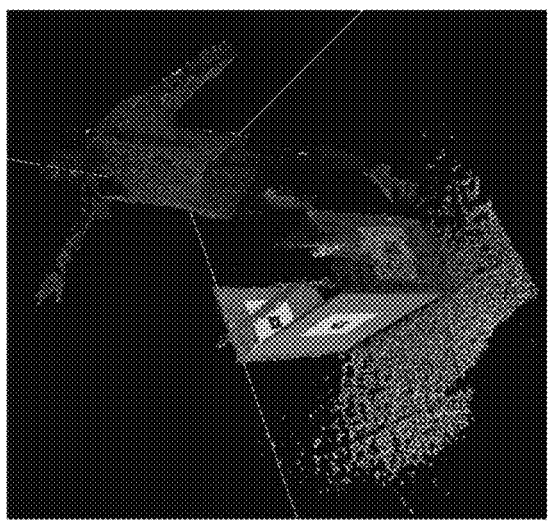
Figure 7B:
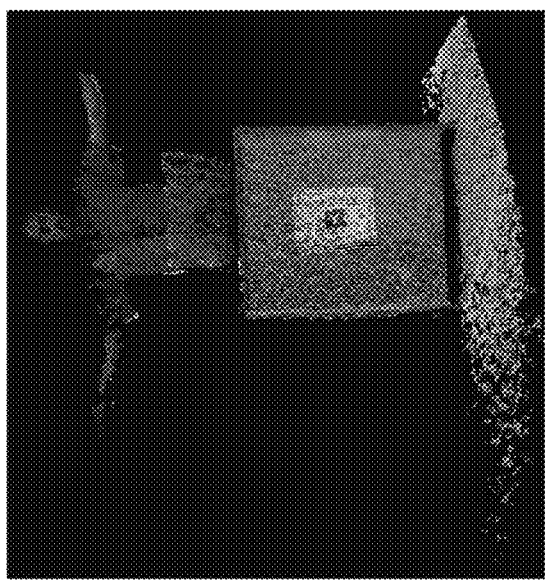
Figure 7B:

FIG. 7B depicts an example FastVDO sensor integrated point cloud (75K points), with some random viewport extractions. The point cloud data captures the action in time in 3D, allowing arbitrary views (even from above and below), and the ability to zoom in/out. This clearly indicates that point clouds are a strong starting point for 6DoF applications.

Figure 7C:
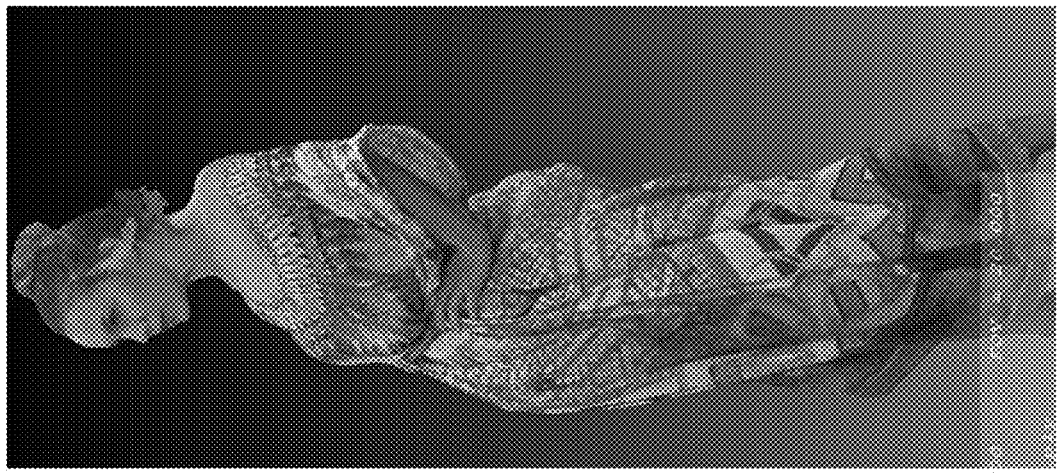
Figure 7C:
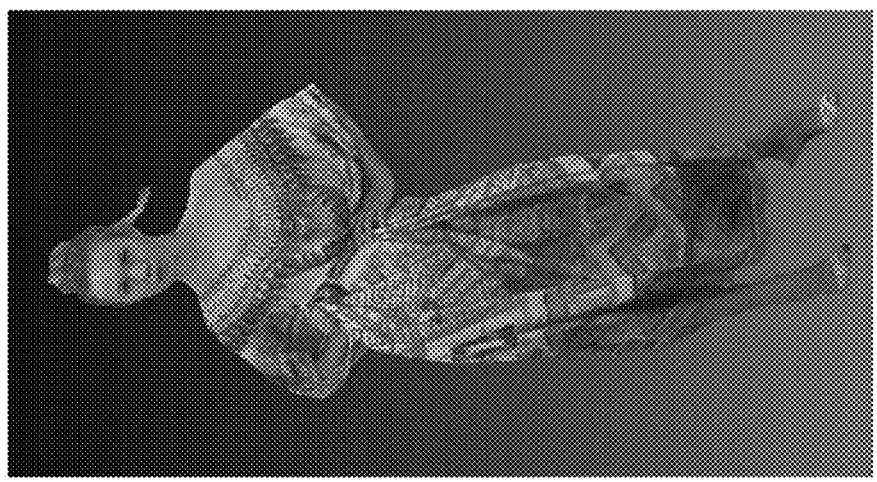

FIG. 7C shows two renders of a high-resolution point cloud (900K points), courtesy of 8i Corp., and using an open source renderer released by Technicolor.

Figure 7D:
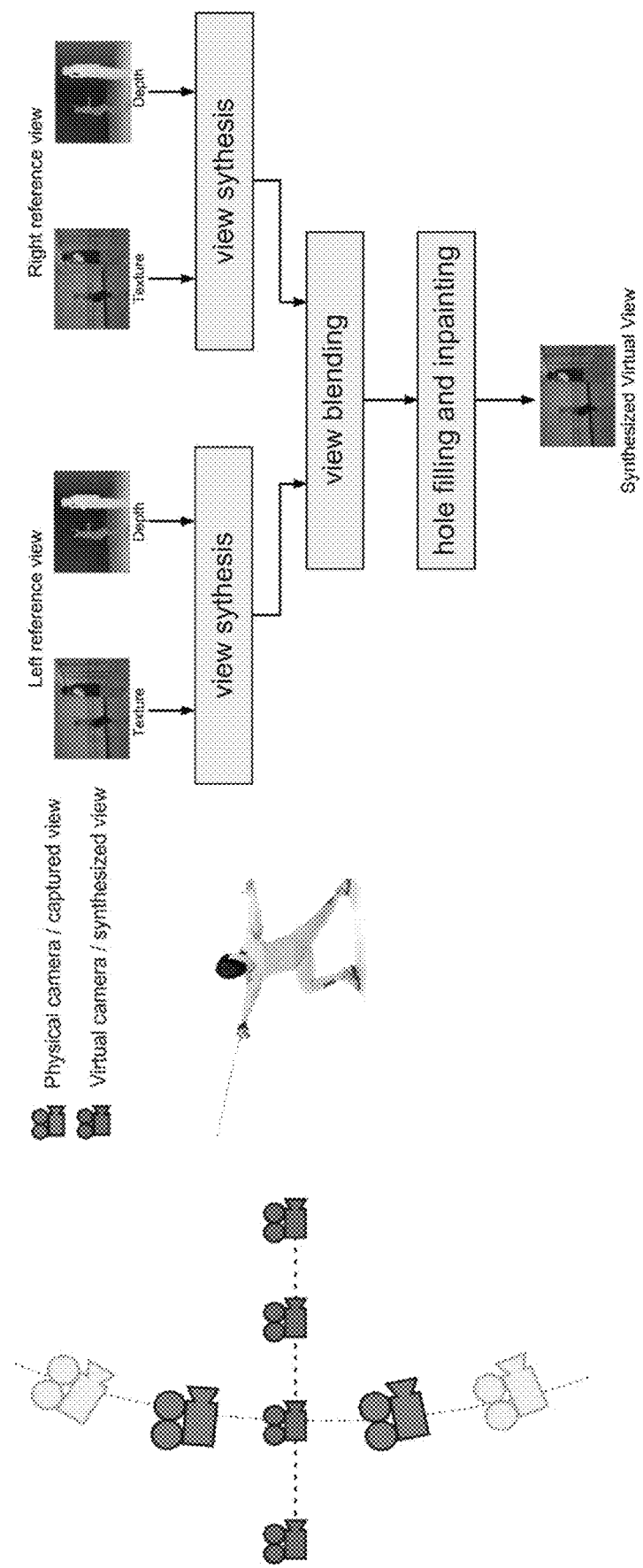

FIG. 7D portrays the key concept of view synthesis, in which new views can be synthesized using available nearby (in location and viewing angle) views. A variety of methods for view synthesis can be brought to bear on this task, including point cloud merging, structure-from-motion, and image warping.

Figure 7E:
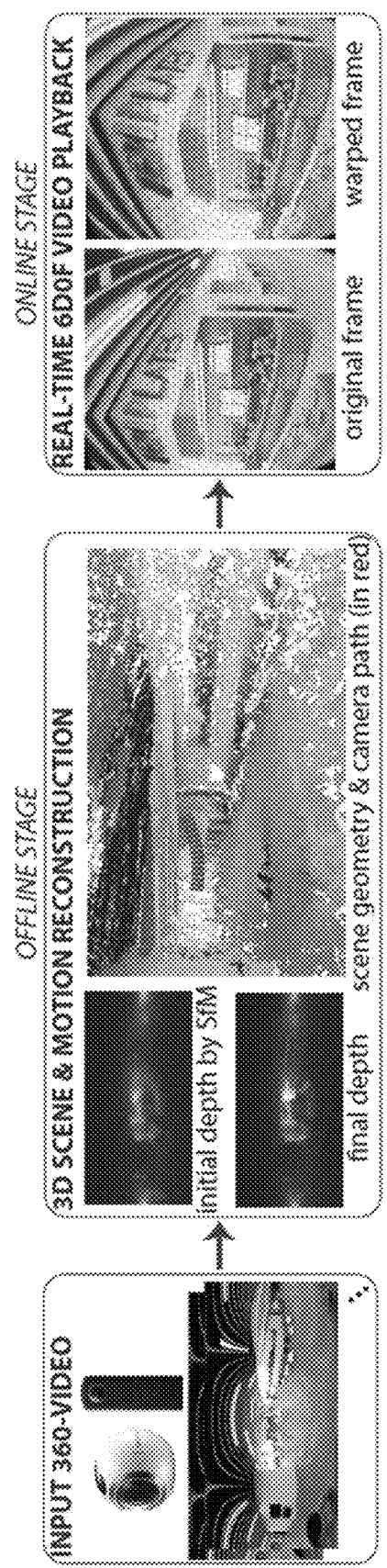

FIG. 7E shows an example method employing a variety of advanced tools to process a single 360-degree video into a (local) 6DoF data, a key technology. This allows our array to be even a single sensor.

Figure 8A:

FIG. 8A depicts some commercial RGB and Lidar sensors, e.g., GoPro Black, a hi-res 4K (2D) sensor, and Sweep, a 40 m range, 360-degree lidar.

Figure 8B:
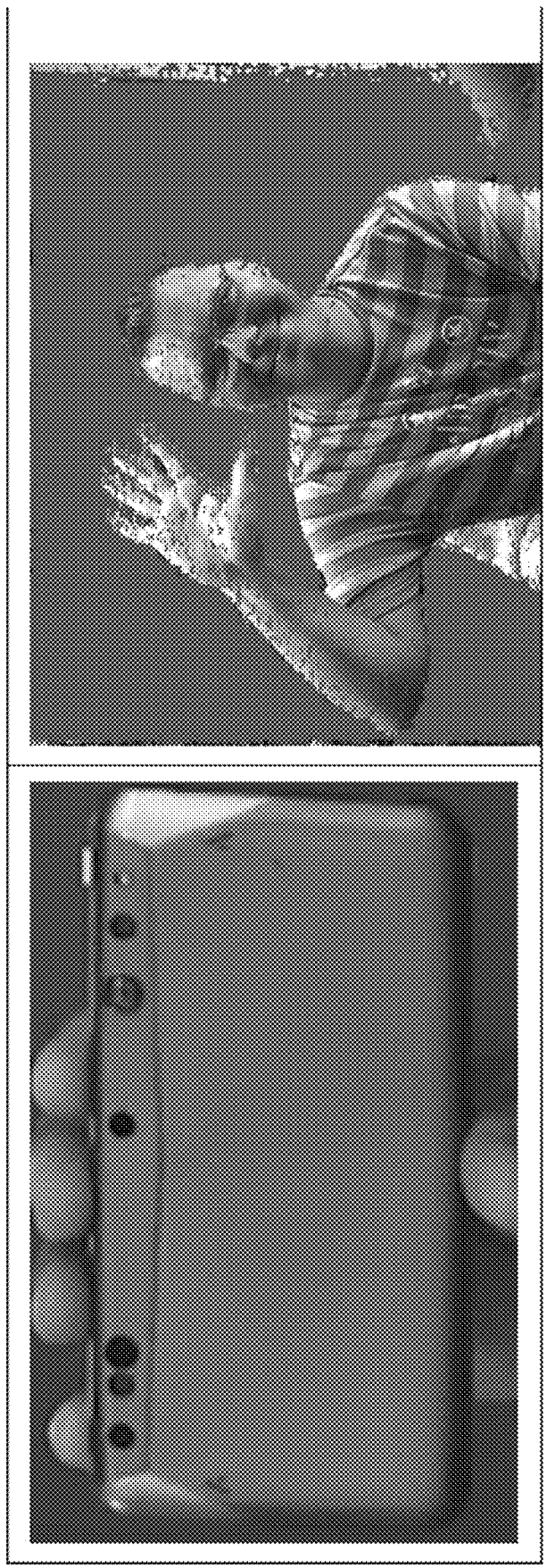

FIG. 8B depicts signal processing with Intel RealSense camera system, with both RGB and IR cameras on-board. (a) a miniaturized RealSense camera system, now embedded in a smartphone. (b) Signal processed, but unsmoothed point cloud plus texture, as produced by the Intel RealSense and the PCL library from a single sensor system. This early result is coarse, but not unreasonable for such a low-cost system aimed at real-time processing. Significant progress remains to be achieved to integrate at the smartphone level. (image credit Intel Corporation.)

Figure 8C:
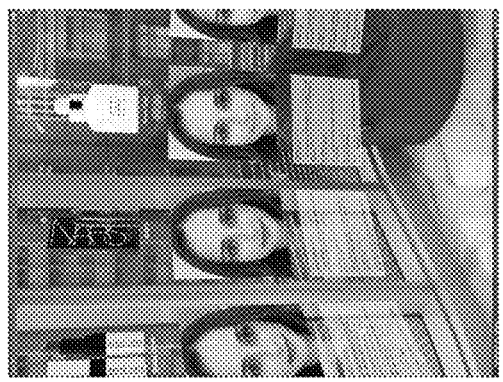
Figure 8C:
Figure 8C:
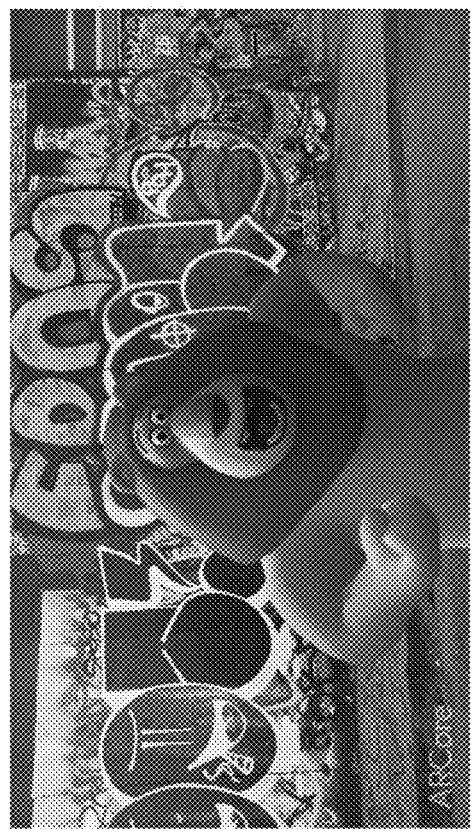

FIG. 8C depicts early consumer AR software technologies released for latest generation Android and iOS smartphones by Google, Apple, respectively.

DETAILED DESCRIPTION OF THE INVENTION

The following patents, utility or provisional patent applications, and their continuations, are hereby incorporated by reference in their entirety: U.S. Pat. No. 8,913,660, "Device and Method for Fast Block-Matching Motion Estimation," Dec. 12, 2014; U.S. Pat. No. 8,428,135, "Fast Sub Sample Block-Matching Motion Estimation," Apr. 23, 2013; US Re 44743, "Digital Composition Coded Multisensory Messages," Oct. 4, 2013; U.S. Pat. No. 8,155,462, "Master Reconstruction Schemes for Pyramid Decomposition," Apr. 10, 2012; U.S. Pat. No. 8,520,736, "Real-Time Superresolution and Video Transmission," Aug. 27, 2013; U.S. Pat. No. 9,524,028, "A Visual Language for Human Computer Interfaces," Dec. 20, 2016; U.S. Pat. No. 9,609,336, "Adaptive coding, Transmission, and Efficient Display (ACTED)", Mar. 28, 2017; US20140347263, "Motion-Assisted Visual Language for Human Computer Interfaces," granted; U.S. Provisional Patent Application, Ser. No. 62/511,290, "Personal Scan Assistant (PSA) As An Integral Augmented Reality Enabler," May 25, 2017.

Games, Divergent Sensing, and Local 6DoF

Today, one the one hand, we have video games, which offer full immersion (6DoF), but with limited realism, offering immersion into a synthetic world, while on the other, we have 360-degree videos or video spheres, which add a richness to a real video experience, allowing the user the look out around at will, but not walk around (3DoF). Thus, we see the two key axes of realism vs level of immersion, as shown in FIG. 1A. What is desired is a fully immersive experience, which has the immersiveness of a video game (FIG. 1B), with the realism of live capture video (FIG. 1C). This invention produces in reality what Hollywood has hinted at for decades, especially with computer graphics imagery (CGI). Movies such as Life of Pi (2012), FIGS. 1D, 1E, showed the successful use of mixed reality, in which a synthetic tiger is generated from models, as well as actual imagery textures, obtained from real tigers. Even more, movies such as JungleBook (2016) as illustrated in FIG. 1F and Avatar (2009) as illustrated in FIG. 1G used deep immersion of real objects inside synthetic worlds, to great effect. Notwithstanding these high achievements, movies can only tell a linear story (albeit credible), with no actual user control or navigability—they offer very high realism but NO degrees of freedom.

Embodiments of the invention allow the capture, representation, communication, and experience, of a fully virtualized world, in which a user can walk about, as well as look around, as in the real world. Moreover, this virtualized world, created from the real world by extensive capture and signal processing, may be significantly augmented by artificial elements in a seamless way, thanks to the similarity to video games in the intermediate representations used. This allows us to populate our real world with Godzillas and the like (e.g., what AR mobile apps are doing now), and also include showing buildings or highways that don't exist, displaying changes in crops, seasons, or climates, and other business, industrial, travel, and many entertainment uses.

To achieve this, the system uses a distributed array of sensors. (A single sensor is also allowed, which, with suitable processing, can then generate a local 6DoF experience.) FIG. 2A shows as an example, a couple of 360 sensor ball from Facebook (×24, and ×6) recently released. These sensors look out from a single point (divergent sensing). We remark first that there are some products in the market that already attempt to create this full six-degrees-of-freedom (6DoF) capability by capturing from a single point (e.g., Lytro Immerge), or HypeVR. In fact, with the Lytro Immerge product using array-based light field sensing—but from a single point only!—one can indeed obtain a very limited 6DoF sense, as objects can be recreated from the extensive sensor array data, and a limited perspective change can be estimated.

Similarly, FIG. 2B shows a high-end, custom sensor platform developed by Intel/HypeVR, which sports 12 Red Pro 5.0 RGB cameras, as well as a Velodyne Lidar (HDL-32E). Note that the use of dual 2D RGB sensors in the rig allows for high-density passive ranging based on stereo vision, while the Lidar performs high quality active ranging (but perhaps at a lower angular resolution). This combination, with advanced signal processing, is a powerful platform for imaging plus ranging. FIG. 2C compares an immersion camera from Lytro, called Immerge, along with the HypeVR rig and the Lidar; it also shows a first consumer-level 360 camera, GoPro Fusion, which is pocket-sized, and targeted at around $500. We note that with sophisticated sensor platforms such as the HypeVR rig, and extensive signal processing, a modicum of ability to walk around, in addition to look around, can be created—in the demo shown by Intel/HypeVR at the 2017 Consumer Electronics Show in January, 2017, in Las Vegas, one can walk around a few feet in either direction. But how can you see what is behind a tree, rock, structure, or a person looking away? You can't. True to their name, this ability has been hyped as actual 6DoF by Intel/HypeVR—though it is clearly not. This is depicted in FIGS. 2D-2F, in which viewing angle also changes. In essence, the very high resolution RGB, and range data captured from the lidar, though from one platform, allows a very high-density point cloud to be populated, and with concomitant additional processing (mesh/textures), allows new viewports nearby to be calculated by signal processing. However, it is central to note that sensing from a single location only allows Local 6DoF. Such a system does not achieve true 6DoF.

Augmented Reality and Convergent Sensing

While 360 sensor balls look out from a center point (divergent sensing), one can work differently by putting a large array of sensors around a central stage, as Microsoft has for its custom HoloLens lab, with 106 high-resolution visible and IR sensors, see FIG. 3A (photo courtesy Microsoft Corp.). This allows what is in the center to be captured from all around (convergent sensing), and be represented with high fidelity. In turn, that information can be stored in point clouds, mesh models and textures (in addition to video data), which can then be manipulated with a video game engine (Unity is integrated), and rendered on a compatible headset—the MS HoloLens headset, as shown in FIG. 3B. This headset allows a user to see the real world through it, yet it is able to introduce additional captured or synthesized objects into it, by projecting their light into the user's eyes. This is augmented reality, and it can be powerful. Yes, the MS HoloLens allows us to experience the true 6DoF we have in the real world, while allowing us to populate it with additional objects that are not there—an impressive feat, and a step forward. Moreover, we can interact with these additional objects, using gestures, see FIG. 3C.

FIG. 3C illustrates interaction with virtual objects in augmented reality: (a) hand-gesture based Google Earth navigation application on a laptop; and (b) hand-gesture based interaction with a virtual object with Microsoft HoloLens. In both cases, objects can be manipulated (e.g., turned) using mere gestures. As haptics and other technologies mature, users will be able to interact with virtual objects through touch, and other senses as well.

FIG. 3D shows a purported demo of an augmented reality headset—from MagicLeap, showing a whale suddenly appearing inside a school gym, to general astonishment; however, with no headsets shown in the video, evidence suggests the video used CGI, not actual augmented reality.

There is an inverse relationship between the density of sensor coverage of an area and the signal processing burden to produce realistic images—more sensors means higher accuracy and higher quality, and thus reduced difficulty of integration. (In the limit of every angle being viewed, no integration would be necessary.) Microsoft's HoloLens studio uses a very dense set of 106 sensors to capture a small stage, 53 RGB sensors, 53 IR depth sensors, all at HD resolution (Microsoft HoloLens). Microsoft's capture studio is a unique, sophisticated, high-cost acquisition system. However, in covering a larger area, and outside a studio environment, this high density and cost factor are unrealistic. While high fidelity is certainly desirable, we view an approach with high sensor densities as impractical for the field, and choose to work instead with a more realistic capture model in this invention. This will be covered below, and depicted in FIG. 4A onward.

Moreover, augmented reality, for example, Microsoft's sensing approach, does not solve the problem of reproducing a large area scene, from either the real or mixed real/synthetic worlds—a 6DoF virtual world.

In fact, Lytro and Intel/HypeVR have envisioned the right goals, though not the right methods. Their approach cannot truly succeed at this task, as no amount of sensing from a single point can recreate what is not visible from that point. By contrast, in our approach, a distributed sensor array system covering the region of interest is used.

Convergent and Divergent Sensing: A New Synthesis For 6DoF Reality

To achieve the desired integration, embodiments reduce the complexity and improve the portability of these systems, simplify the approach, and offload residual work to signal processing servers where possible. Thus, in the disclosed embodiments, a region of terrain, preferably nearly flat, is populated with a sensor grid, that captures 360-degree video, 360 depth or range data, and 3D audio, at each point in the sensor grid. If depth is measured using stereo 2D vision, then depth processing is included in the system. The sensor grid is notionally laid out in a regular pattern of equilateral triangles, as pictured in FIG. 4A. FIG. 4A illustrates a system integration according to an embodiment, with sensor grid of 360 video sensors plus 360 range sensors (e.g., IR, Lidar, stereo vision), and a user view. In the real world, you see what you sense. While not every view can be directly sensed, a moderately dense grid of sensors allows any user position/gaze (view) to be synthesized from nearby views. The system combines data from convergent and divergent sensing, to achieve 6DoF reality. As the grid is made of fully 360 audio/video/range sensors, this incorporates both divergent and convergent sensing.

This grid has as a basic unit, a triangle of sensor points (where sensor balls are placed). Thus, it suffices to solve the interpolation problem within a given triangle, for this method to generalize to any area so covered. Embodiments perform interpolation using a method called view synthesis described herein. This triangle is also the minimum limit of the augmented reality processing pipeline used for example for the Microsoft HoloLens (as we demonstrate below), whose capture lab is depicted in FIG. 3A.

FIGS. 4B and 4C, utilize the synchronized capture from a grid-based sensor array of genlocked sensors according to FIG. 4A. From FIG. 4A, a user is virtually located somewhere in the field of the sensor array, and for a short time window, is gazing in a given arbitrary direction (location+gaze=view, in our parlance). The server represents a view as a set of numbers, (x, y, z, theta). The set of numbers are typically all real numbers. In some embodiments, the server uses a planar approximation of the region covered by the sensor grid, and dispenses with the vertical z coordinate. Embodiments of the server perform discretization, or quantization, of these parameters. FIG. 5 depicts an example embodiment of the server that takes a basic sensor grid triangle and breaks it into many subtriangles, whose center points represent the quantization of the points within the triangle. Since any location of the user would fall within such a sensor triangle, the server matches a user location to its nearest quantized locations. Similarly, the server quantizes the gaze central angle theta into angular increments (for example, 5 degrees).

The server considers a discrete but relatively dense set of points within the sensor field, and a similar discrete set of directions of viewing, and creates a discrete set of indexed views. FIG. 5 shows a discretization in triangles of the basic sensor grid triangle for spatial discretization. For gazing direction, the server could discretize a full sphere of possible center viewpoints. But given that the visual attention, in a typical 360 video, tends to be focused on what is front and center (FIG. 6), the server selects a subset of discretizing angles around the equatorial circle, making the task of view synthesis manageable.

For any view within the discrete set of indexed views, the server generates a suitable viewport. A viewport is a video (images at a given rate, for example, 30 frames per second). The server creates a viewport video from the point cloud/mesh/texture models, along with lighting and shading models, by sampling at a grid of points for a given desired resolution of video (say 1920×1080). In some embodiments, the server sends the viewport video to the receiver if there is available bandwidth. In other embodiments, the server sends the pmt model to the receiver. The server decides whether to send the viewport video itself or the pmt model depending on relative compactness of the data, as well as capabilities of the receiver. A set of viewports is referred to herein as a viewport library. The server starts with each grid sensor unit, and creates a time-based point cloud (PC) for the visual field in the vicinity of each grid point (and similarly with the audio field). In an embodiment, the server only creates point cloud for a portion of the visual field for a given short time window. In an embodiment, the server selects the size of the time window to be a value that is small relative to the time that is the threshold of user interaction latency detectability for a VR experience, as determined based on experimental evidence, for example, 20 ms. This PC is smoothed to remove outliers, and used to produce a smoothed mesh representation, which is texture mapped using the RGB camera data. For each library viewport, the server generates the view by synthesizing the views from multiple sensor grid points, using view synthesis (described in detail below).

FIG. 4B depicts the client-server architecture used in the 6DoF virtual reality server according to an embodiment. The receiver detects the user view, plus timeliness and quality of service (QoS) for any previous viewport relays, and conveys to server. In an embodiment, when a request for a viewport is sent to the server, the client measures the delay before the viewport delivery is initiated, e.g., when the first packet of the viewport arrives at the receiver. This is referred to as the response latency, and is measured in fractions of a second, such as miliseconds (ms). It is known that responses of more than 20 ms would be noticeable in a VR application, and much longer response latencies can cause actual discomfort in a user, since it is disorienting. Secondly, once the stream is initiated, the quality of the service itself is an issue. The stream needs to be smooth, without disruptions, freezes or jerkiness (e.g., the total of times of disruptions, called lag length, is preferably small or zero), of visibly high and consistent quality (e.g., measured in bitrate as well as quality measures such as peak signal-to-noise ratio of the stream, as a function of time). So measures of stream quality of service (QoS), well known in the art, are applied to ensure good QoS. The server determines the data rate and resolution of the video sent to the client based on the QoS and the type of network, i.e., public network or private network. If the server determines based on the QoS, that the quality is below acceptable limits, the server reduces the bitrate in a public network. The server may reduce the bitrate and potentially the resolution of the compressed video stream. In a private network in which the server has more control, the server may increase the bitrate used by the application. If the server receives latency information from the client, the server records the information. If viewport generation computation is a significant contributor to the response latency, the server may choose to offload some of the processing, choose a lower complexity processing mode, or precompute some nearby viewports to reduce latency. The server creates or calls up suitable stored viewports from library, and transmits to receiver. In some embodiments, the final refinement to actual view is done at the server. In other embodiments, the final refinement to actual view is done at the client receiver. In some embodiments, the server implements various modes of processing, compression, and transmission, in response to the QoS data. For example, the server can switch between several processing and compression modes: low-delay mode, low-complexity mode, and high-quality mode. The server determines the capability and bandwidth available for a client and selects an appropriate mode. In some embodiments, the server performs resource allocation among available servers and the client, and offloads some of the processing to other devices, depending on their capability and availability.

FIGS. 4C, 4D, and 4E treat the system in greater detail. In one embodiment of the invention, referring to FIG. 4C, a desired viewport is generated at a server, precomputed offline or in real-time, by a method as depicted in FIG. 4D, prior to transmission, either as point cloud/mesh/texture (pmt) of the viewport, or even as a video. The point cloud/mesh/texture (pmt) representation of the viewport is also referred to as the pmt data of the viewport. In an embodiment, the pmt data is represented as a set of vertices, edges, triangles, and textures that map onto the triangles. These textures are portions of images, each portion corresponding to a triangular portion of an image. The portion of image may be represented using one or more pixels. The set of portions may be represented using a data structure such as an array or list. Each triangular region corresponds to three sets of coordinate triplets, each coordinate triplet representing a vertex of the triangle.

Due to the a priori discretization of the locations, the matching to best nearby sensor grid points is computed in advance. These are the grid points closest to a quantization point. Now for a given user location, the grid points closest in distance are the used (one, two or a few locations, depending on the resources available to the server and client). Moreover, if the user location is a distance "a" from gridpoint 1, and "b" from gridpoint 2, one embodiment uses relative weights w1, w2, in combining the viewports from gridpoints 1 and 2 as follows:

$$w1=(b^2/(a^2+b^2));$$

$$w2=(a^2/(a^2+b^2));$$

When a=b, these are both ½. A simpler model can also be used: w1=b/(a+b), w2=a/(a+b).

In essence, the server receives the user position and gaze (view) for a short time window, selects one or more relevant sensor grid points, and uses point cloud/mesh/texture creation, integration and view synthesis methods to generate the desired view. In particular, view synthesis refers to any combination of the following methods: 360 processing, depth/range processing, point cloud generation, mesh generation, texture mapping, geometric transformations, structure-from-motion, and image warping, to achieve a synthesis of one or multiple views to create a novel view. 360 video processing is the task of stitching the different sensor ball views into a spherical video. This technology is now well known in the art. Similarly, while active IR and lidar sensors directly read out range data, other means of obtaining depth include stereo vision processing. Computing depth from parallax is also well known in the art, and will be assumed (cf., the book by Hartley and Zisseman). This general method of viewport generation is referred to herein as the Point cloud-Mesh-Texture (PMT) Method, or PMTS, with view synthesis included. FIG. 4D indicates the server-side method.

According to two embodiments:

(a) The system precomputes a library of discrete viewports.

(b) The system generates viewports on-the-fly as needed.

In either embodiment, the process comprises the following steps. A system refers to either the server or the receiver that performs the processing.

(1) For a hypothetical desired view, including location and gaze direction, the system locates the nearest grid points, and computes their distances.

(2) From those distances, the system computes relative weights, by formulas presented.

(3) Given the viewing gaze direction, the system develops an envelope around it (e.g., 100 degrees horizontal, and 60 degrees vertical).

(4) The system extracts the viewports from the nearest sensor grid locations at matching directions.

(5) The system extracts the point clouds, meshes, and textures from these grid viewports.

(6) The system sequentially merges the point clouds, meshes, and textures from these grid viewports, to create the pmt of the desired viewport.

(7) If the viewport was computed by the server, the server sends the pmt, or the generated viewport as a video, to the receiver.

(8) Alternatively, the server computes the final adjustment to the actual view, and again, sends pmt, or video as the viewport, to the receiver.

In an embodiment, the server removes the portions of images that show sensors, with background image portions. For example, each sensor may view the other sensors in an image of the 360 video. Since the sensor was placed to be able to record the imagery and is not expected to be a part of the imagery, the server performs image editing to remove the visual representation of the sensors from each image and replace it with background imagery. In an embodiment the server replaces the sensors by performing the following steps: (1) background capture and calibration, (2) placement of sensors, one by one, with incremental sensor substitution with background, and (3) final system calibration to show any view without showing any of the sensors.

FIG. 4E indicates the receiver-side method. At the receiver, the user position and gaze (view) is detected, and sent to server (or local processor). From there, a nearest indexed viewport is created or called up from stored library. This viewport is adjusted to the actual view, using view synthesis methods. Finally, it is rendered at the receiver (e.g., a screen or headset) for the receiver, in the short time window while the current gaze is active. Periodically (and frequently), the system produces an update to the user view, until the application is no longer active. Note that we speak of server and receiver as distinct objects, but in reality the server can be remote, local, or even part of the receiver. The concepts of server and client receiver are merely for segmenting the computational tasks, which allows but does not necessitate remote operation. In any case, the last line of blocks in FIG. 4B is performed at the receiver.

In other embodiments, parts of the pmt for the sensor grid itself is transmitted as needed, or all stored locally, and the viewport generated at receiver. In yet other embodiments, functionalities of structure-from-motion, as well as image warping, are used to create the desired viewports by view synthesis.

In generating the desired viewports, one has the opportunity to modify it for a variety of purposes, from image enhancement (e.g., lighting, shading, color or contrast adjustment, etc.), to annotation, to embellishing with augmentations from elements from the real or synthetic world. Importantly, because our intermediate representations are aligned with those used in the video game industry, augmentations with either other real or synthetic elements, which are similarly represented (e.g., pmt), that are precaptured or precomputed and stored, or created on demand, can be easily mixed into the viewports generated and transmitted.

Embodiments of the invention use view synthesis as a component. This topic is covered, and referring to FIGS. 7D, and 7E, the following references are hereby incorporated in their entirety: (1) R. Hartley, A. Zisseman, *Multiple View Geometry in Computer Vision*, Cambridge Press, 2003; (2) K. Wegner et al, ISO/MPEG doc. M40809, Turin, IT, July, 2017, and ISO/MPEG doc. M37232, Geneva, CH, October, 2015; (3) J. Huang et al, "6DoF VR videos from a single 360-camera," IEEE 2017 V R Conference, Los Angeles, March, 2017; (4) G. LaFruit et al, "[MPEG-I Visual] Next generation light field coding with view synthesis," ISO/MPEG doc. M40782, Torino, IT, July, 2017.

To summarize, one embodiment of the invention, at the server, is as follows:

A method of transmitting a six degrees of freedom virtual reality experience, using a client-server architecture, by, at a server, 1. Receiving, during a given short interval of time, user virtual position and gaze (view), and QoS measures, from a receiver client, within a sensor field of 360 video, range, and audio sensors;

2. Computing or calling up precomputed nearest library viewport to requested view, said viewport developed using any combination of the following image processing and view synthesis tools, applied to the sensor array data:
   360 processing;
   Depth/range processing;
   Point cloud generation;
   Mesh generation;
   Texture mapping;
   Point cloud/mesh/texture (pmt) merging methods;
   Geometric transformations;
   Structure from motion (SfM) methods;
   Image warping.

3. Sending the selected library viewport, or its refinement created using the view synthesis methods above, in mono or stereo vision, to the receiver, as either pmt data or as compressed video.

4. Seeking the next requested view in the next short interval of time.

5. Upon receiving a new view, modifying the viewport per above, or with no change of view, sending the existing viewport for the next interval of time;
6. Upon receiving no further view request, terminating session.

In an embodiment, the system uses iterative closest point (ICP) for merging point clouds that have some overlap. As an example, to merge two point clouds the system performs:

a) One point cloud is designated as the reference point cloud (RPC) and the other as source point cloud (SPC).

b) For each point in the SPC, match the closest point or a select set of points in RPC.

c) Estimate the combination of rotation and translation using a root mean square point to point distance metric minimization technique which will best align each point in SPC to its match found in the previous step after weighting and rejecting outlier points.

d) Transform the source points using the obtained transformation.

e) Iterate from a) to d) till a threshold is reached.

Similarly, merging meshes is also well known in the art, and incorporated as existing library functions within video game engines (e.g., CombineMeshes function within the Unity game engine). And merging textures is part of existing core functionalities in many packages, such as MeshLab.

In other embodiments, the library of viewports are precomputed and stored at the server. Various other embodiments can be readily envisioned and be constructed, and the invention is not limited to those explicitly named here.

In one embodiment of the invention, at the receiver, is as follows.

1. A method receiving a six degrees of freedom experience at a receiver client in a client-server architecture, by:
2. Sending, for a short time interval, the user virtual position and gaze (view) within a sensor grid of 360 video, range, and audio sensors, as well as QoS measures, to a server;
3. Receiving, computing, or calling up precomputed nearest library viewport to requested view, said viewport developed using any combination of the following image processing and view synthesis tools, applied to the sensor array data:
360 processing;
Depth/range processing;
Point cloud generation;
Mesh generation;
Texture mapping;
Point cloud/mesh/texture (pmt) merging methods;
Geometric transformations;
Structure from motion (SfM) methods;
Image warping.
4. Receiving the selected library viewport, or its refinement created using the view synthesis methods above, in mono or stereo vision, at the receiver, as either pmt data or as compressed video.
5. Sending the next requested view in the next short interval of time.
6. Upon receiving a new viewport, modifying the viewport as needed per above, or with no change of view, receiving the existing viewport for the next interval of time;
7. Upon no further user view requests, terminating the session.

In some embodiments, the receiver may do the final refinement of the viewport to the actual view of the user. In other embodiments, the server and the receiver may be co-located, or even be a single device or software module. Various other embodiments can be readily envisioned and be constructed, and the invention is not limited to those explicitly named here.

Now, to be concrete, we work to get a hands-on feel for how this technology works. FIG. 7A depicts a low-cost, test system: a system of 3 Microsoft v2 sensors in a basic triangle layout, around a central "stage", in direct comparison to the MS HoloLens stage. These elementary and inexpensive sensors have the following specifications: a 1080p RGB sensor at 30 Hz, and a 512×424 active IR depth sensor, with a 70 deg horizontal×60 deg vertical FOV, and a range of 0.5-4.5 meters. The depth sensor thus has 217K pixels, and with proper analysis of location and orientation, could ideally produce 217K points in 3D space of the scene—a point cloud. In reality, it produces somewhat fewer points in the point cloud; that number reduces further after integration with other sensors.

A key advantage of a point cloud is that it is a true 3D representation. With multiple sensors, and with proper calibration, these point clouds can be matched and integrated. In our tests in FIG. 7B, we achieve 75K points in the integrated point cloud from the 3 sensor systems. Once achieved, this point cloud allows arbitrary viewing angle, including from above and below, as well as arbitrary zoom in/out; that is, an arbitrary viewport can be synthesized.

While the quality of this particular 3D representation is modest, that is a short-term issue. FIG. 8A shows a GoPro Hero5 camera, with a 4K sensor (having ~8M pixels, at 30/60 fps). Similar improvements in IR or Lidar technology are required, and in development. The Velodyne Lidar sensors are expensive, but inexpensive lidar sensors are in demand and on the rise, as shown in FIG. 8A, with a compact, $250 model with 40 m range called Sweep making. Due to applications in a variety of fields, especially driverless cars, lidar technology is now ripe for mass commercialization, bringing with it, consumer-level pricing for high performance. Thus, a reasonably high-performance "prosumer" sensor rig, analogous to the HypeVR rig, is employed, which moreover scales to cover an area with a sensor grid.

As seen in FIG. 7C (LongDress, 900K points, courtesy 8i Corp.), a higher resolution point cloud representation allows a high-quality representation of a 3D object (a model); we rendered it using an open source tool called PccAppRenderer, released by Technicolor. And high-resolution point clouds launch the entire PMTS processing chain.

For consumer-level AR/VR, Intel has pushed its RealSense camera system down to a smartphone, leading to smartphone depth and RGB sensing and 3D representation (FIG. 8B). Meanwhile, both Apple and Google have launched AR software toolkits for their respective mobile operating systems (e.g., ARKit for Apple iOS 11, prereleased in June, 2017, and ARCore from Google Android, released Aug. 29, 2017); see FIG. 8C. These consumer smartphones allow early availability of AR for the masses.

Example AR/VR Application Concept

Our systems approach to capture and creation of the virtual world begins with just a triangle of sensors, for which we prefer to use commercial sensors. While numerous sensor balls already exist, even the signal processing, compression, and real-time communication of the video sphere is challenging (e.g., work on 360 video compression at the ITU/ISO/IEC Joint Video Exploration Team). Meanwhile, existing compression and communications technologies are actually mature and available (e.g., High Efficiency Video Coding (H.265/HEVC) of the texture maps, plus mesh compression). While there are many ways to do the signal processing, it is the real-time transmission and rendering, which needs to be done within approximately 20 ms, which is the most challenging part. This problem, of course, persists and slightly magnifies in our applications. The only solution to that problem though is faster networks (e.g., 5G), faster on-board signal processing capability (e.g, local ASIC computation), and precomputing where possible (e.g., viewport library). The 5G network aims to offer up to 1 Gb/s speeds to local areas, 100 Mb/s in metro areas, and significantly reduced latencies (1 ms) compared to LTE networks—a key improvement for our applications.

As already remarked, an interesting observation in M. Yu et al, 2015, is that while the video sphere is rich in data, the user attention or frequency-of-access is fairly narrowly focused in the front and horizontal directions; see FIG. 6. This greatly assists in performing the needed view synthesis without overburdening systems and networks.

This allows us, in the first instance, to actually use ordinary 2D video sensors along the equator (+depth/range+ 3D audio) sensors as a starting point for our analysis. Our approach is to leverage existing component technologies to obtain a novel, interactive, 4D representation (3D+time) of a full volume of space and time. Today, sophisticated sensor systems are used to create realistic local virtual realities. However, with maturing signal processing, our approach is that simpler capture systems are more applicable, and fieldable, with nimble signal processing to create a true 6DoF experience. Fast, and accurate, image and signal processing has been a hallmark of FastVDO for decades, and borne in our products and patents.

Thus, one embodiment of our method may be summarized by the following example AR/VR application system and approach.

1. Capture 360-degree video, depth/range, and 3D audio at a distributed grid of points over an area, using commercial prosumer sensors, as in FIG. 4A.

2. Compute in advance or on-demand a library of discrete viewports at these grid points, with quality focused within the individual triangles, and at horizontal azimuths, according to FIGS. 4B-4D. This forms a large library of available viewports. Precomputed and stored library could form the basis of streaming, or media-based delivery, as it will critically reduce latency. Delivering say a 1080p viewport with a modern codec such as H.265/HEVC requires about 1-2 Mb/s (<1 Mb/s or less with a successor codec, H.266), a very achievable data rate even for today's networks, while hardware HEVC codecs ASICs are already available. 5G networks will support much higher rates and fidelities, while also drastically reducing latencies. 5G networks will be a bonanza for AR/VR applications.

3. Design an AR/VR application using an interactive screen or head-mounted receiver, together with a server, in which a user is free to move about in the virtual area, and look in any direction. The angular motion is achieved by actual angular motion of the receiver, while the spatial motion may be achieved by actually moving (this requires open environment), or by a joystick or a visual gesture such as with hands.

4. In the application, the user's position and head orientation invoke suitable existing viewports from the library, stored at a server—possibly remote, but potentially nearby or even at receiver.

5. The receiver makes the final integration of the nearest available viewports (typically 1-3), to render an integrated view.

6. In the available viewport library, predesigned augmented reality elements may also be present, and included in the pmt-based viewports for integration. These components are built compatible with video game engines (e.g, Unity, or Unreal), thus allowing seemless mixing of real and synthetic elements in the rendered video.

Additional Configuration Information

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon.

Certain embodiments are described herein as including logic or a number of components, modules (herein may be also referred to as "tools"), or mechanisms, for example, as illustrated in the figures. Modules (or components) may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In some embodiments, a software module is implemented with a computer program product comprising a computer-readable medium containing computer program code, which can be executed by a computer processor for performing any or all of the steps, operations, or processes described.

In some embodiments, a hardware module may be implemented electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. Hardware module implemented herein may be implemented in dedicated and permanently configured circuitry, or in temporarily configured circuitry (e.g., configured by software).

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

What is claimed is:

1. A method of generating a six degrees of freedom virtual reality video using a client-server architecture, the method comprising:
   storing, by a server, information identifying an array of sensors distributed over a geographical area, the sensor array comprising a plurality of sensors, each sensor configured to capture one or more of a 360-degree video, a range, or audio, each sensor positioned at a distinct location in the geographical area;
   receiving, by a server from a client device of a user, a set of coordinates identifying a user location and a view angle of the user corresponding to a gaze of a user, wherein the user location represents a virtual location of the user in the geographical area and the view angle represents a virtual view angle of the user in the geographical area;
   storing a viewport library comprising a plurality of precomputed viewports, each viewport corresponding to a distinct user location and a user view angle, the storing comprising:
      triangulating the geographical area to identify a plurality of triangular areas;
      determining one or more viewports corresponding to each triangular area; and
      storing the determined one or more viewports in the viewport library as the plurality of precomputed viewports, and
   wherein each viewport of the plurality of precomputed viewports is computed by:
      selecting a subset of sensors from the plurality of sensors based on a measure of distance of each sensor from the user location corresponding to the viewport;
      for each sensor from the selected subset of sensors:
         identifying a 360-degree video obtained by the sensor; and
         extracting a portion of the 360-degree video obtained by the sensor, wherein the portion of video extracted from the 360-degree video is determined based on the view angle of the viewport;
   responsive to receiving the user location and the view angle of the user, identifying a nearest stored viewport from the viewport library for sending to the client device of the user;
   synthesizing the identified nearest viewport by synthesizing a video from the point of view of the user location corresponding to the identified nearest viewport in the direction of the user view angle corresponding to the identified nearest viewport from the extracted portions of each of the identified 360-degree videos obtained from the subset of sensors selected for the identified nearest viewport, the synthesizing based on one or more techniques comprising: depth/range processing, point cloud generation, mesh generation, and texture mapping; and
   sending the synthesized viewport to the client device of the user.

2. The method of claim 1, wherein the subset of sensors selected from the plurality of sensors for a viewport of the plurality of precomputed viewports comprises sensors that are closest to the user location of the viewport, based on the measure of distance of each sensor from the user location.

3. The method of claim 1, wherein, for a viewport of the plurality of precomputed viewports, the portion of video extracted from the 360-degree video represents a portion of the 360-degree video that is within a threshold angle from the view angle corresponding to the viewport.

4. The method of claim 1, wherein the user position is a first user position and the set of coordinates is a first set of coordinates, the subset of sensors is a first subset, the identified nearest viewport is a first viewport, the method further comprising:
   receiving, by the server from the client device of the user, a second set of coordinates identifying a second user position responsive to the user moving from the first user position to the second user position;
   determining a second subset of the plurality of sensors based on a measure of distance of each sensor from the second user position;
   for each of the sensors from the second subset of sensors:
      identifying a 360-degree video obtained by the sensor; and
      extracting a portion of the 360-degree video, wherein the portion of video extracted is determined based on the view angle of the user;
   synthesizing a second viewport representing a video from the point of view of the second location of the user in the direction of the gaze of the user from the extracted portions of each of the identified 360-degree videos obtained from the second subset of sensors, the synthesizing based on one or more techniques comprising: point cloud generation, mesh generation, and texture mapping; and sending the second synthesized viewport to the client device of the user.

5. The method of claim 1, wherein the view angle of the user is a first view angle of the user, the identified nearest viewport is a first viewport, the method further comprising:

receiving, by the server from the client device of the user, a second view angle of the user responsive to the user changing the gaze from the first view angle to the second view angle;

for each of the sensors from the subset of sensors:
extracting a new portion of the 360-degree video, wherein the new portion of video extracted is determined based on the second view angle of the user;

synthesizing a second viewport representing a video from the point of view of the location of the user in the direction of the second gaze of the user from the extracted new portions of each of the identified 360-degree videos obtained from the subset of sensors, the synthesizing based on one or more techniques comprising: point cloud generation, mesh generation, and texture mapping; and sending the second synthesized viewport to the client device of the user.

6. The method of claim 1, wherein the server further receives one or more quality of service (QoS) measures from the client and determines, further comprising:

determining, based on the QoS measures, a bit rate and resolution of the video corresponding to the viewport and sending the video to the client device of the user using the determined bit rate and resolution.

7. The method of claim 1, wherein the viewport is sent as one of point cloud/mesh/texture (pmt) data or a compressed video.

8. The method of claim 1, wherein the synthesizing of the viewport is further based on techniques comprising 360 processing, point cloud/mesh/texture (pmt) merging methods, geometric transformations, structure from motion (SfM) method, and image warping.

9. The method of claim 1, further comprising:
modifying the synthesized viewport via one or more of: enhancement or annotation.

10. The method of claim 1, further comprising:
modifying the synthesized viewport by embedding augmentations based on objects that are real or synthetic elements.

11. A computer readable non-transitory medium storing instructions for receiving a six degrees of freedom virtual reality experience at a receiver client in a client-server architecture, the instructions for:

storing, by a server, information identifying an array of sensors distributed over a geographical area, the sensor array comprising plurality of sensors, each sensor configured to capture one or more of a 360-degree video, a range, or audio, each sensor positioned on a distinct location in the geographical area;

receiving, by a server from a client device of a user, a set of coordinates identifying a user location and a view angle of the user corresponding to a gaze of a user, wherein the user location represents a virtual location of the user in the geographical area and the view angle represents a virtual view angle of the user in the geographical area;

storing a viewport library comprising a plurality of precomputed viewports, each viewport corresponding to a distinct user location and a user viewing angle, the storing comprising:

triangulating the geographical area to identify a plurality of triangular areas;

determining one or more viewports corresponding to each triangular area; and storing the determined one or more viewports in the viewport library as the plurality of precomputed viewports, and wherein each viewport of the plurality of precomputed viewports is computed by:

selecting a subset of sensors from the plurality of sensors based on a measure of distance of each sensor from the user location corresponding to the viewport;

for each sensor from the selected subset of sensors:
identifying a 360-degree video obtained by the sensor; and extracting a portion of the 360-degree video obtained by the sensor, wherein the portion of video extracted from the 360-degree video is determined based on the viewing angle of the viewport;

responsive to receiving the user location and the view angle of the user, identifying a nearest stored viewport from the viewport library for sending to the client device of the user synthesizing the identified nearest viewport by synthesizing a video from the point of view of the user location corresponding to the identified nearest viewport in the direction of the user viewing angle corresponding to the identified nearest viewport from the extracted portions of each of the identified 360-degree videos obtained from the subset of sensors selected for the identified nearest viewport, the synthesizing based on one or more techniques comprising: depth/range processing, point cloud generation, mesh generation, and texture mapping; and sending the synthesized viewport to the client device of the user.

12. The computer readable non-transitory medium of claim 11, wherein the subset of sensors selected from the plurality of sensors for a viewport of the plurality of precomputed viewports comprises sensors that are closest to the user location of the viewport, based on the measure of distance of each sensor from the user location.

13. The computer readable non-transitory medium of claim 11, wherein, for a viewport of the plurality of precomputed viewports, the portion of video extracted from the 360-degree video represents a portion of the 360-degree video that is within a threshold angle from the view angle corresponding to the viewport.

14. The computer readable non-transitory medium of claim 11, wherein the user position is a first user position and the set of coordinates is a first set of coordinates, the subset of sensors is a first subset, the identified nearest viewport is a first viewport, wherein the stored instructions are further for:

receiving, by the server from the client device of the user, a second set of coordinates identifying a second user position responsive to the user moving from the first user position to the second user position;

determining a second subset of the plurality of sensors based on a measure of distance of each sensor from the second user position;

for each of the sensors from the second subset of sensors:

identifying a 360-degree video obtained by the sensor; and extracting a portion of the 360-degree video, wherein the portion of video extracted is determined based on the view angle of the user;

synthesizing a second viewport representing a video from the point of view of the second location of the user in the direction of the gaze of the user from the extracted portions of each of the identified 360-degree videos obtained from the second subset of sensors, the synthesizing based on one or more techniques comprising: point cloud generation, mesh generation, and texture mapping; and sending the second synthesized viewport to the client device of the user.

15. The computer readable non-transitory medium of claim 11, wherein the view angle of the user is a first view angle of the user, the identified nearest viewport is a first viewport, the viewport is a first viewport, wherein the stored instructions are further for:

receiving, by the server from the client device of the user, a second view angle of the user responsive to the user changing the gaze from the first view angle to the second view angle;

for each of the sensors from the subset of sensors:
extracting a new portion of the 360-degree video, wherein the new portion of video extracted is determined based on the second view angle of the user;

synthesizing a second viewport representing a video from the point of view of the location of the user in the direction of the second gaze of the user from the extracted new portions of each of the identified 360-degree videos obtained from the subset of sensors, the synthesizing based on one or more techniques comprising: point cloud generation, mesh generation, and texture mapping; and sending the second synthesized viewport to the client device of the user.

16. The computer readable non-transitory medium of claim 11, wherein the server further receives a quality of service measure from the client and determines, wherein the stored instructions are further for:

determining a resolution of the video corresponding to the viewport and sending the video to the client device of the user using the determined resolution.

17. The computer readable non-transitory medium of claim 11, wherein the viewport is sent as one of point cloud/mesh/texture (pmt) data or a compressed video.

18. The computer readable non-transitory medium of claim 11, wherein the synthesizing of the viewport is further based on techniques comprising 360 processing, point cloud/mesh/texture (pmt) merging methods, geometric transformations, structure from motion (SfM) method, and image warping.

19. The computer readable non-transitory medium of claim 11, wherein the stored instructions are further for:
modifying the synthesized viewport via one or more of: enhancement or annotation.

20. The computer readable non-transitory medium of claim 11, wherein the stored instructions are further for:
modifying the synthesized viewport by embedding augmentations based on objects that are real or synthetic elements, wherein the embedded objects represent one or more of decorations, furnishings, buildings, structures, or synthetic people or creatures.

21. A computer system comprising:
one or more processors; and a computer readable non-transitory medium storing instructions for providing a six degrees of freedom virtual reality experience at a client in a client-server architecture, the instructions for:

storing, by a server, information identifying an array of sensors distributed over a geographical area, the sensor array comprising plurality of sensors, each sensor configured to capture one or more of a 360-degree video, a range, or audio, each sensor positioned on a distinct location in the geographical area;

receiving, by a server from a client device of a user, a set of coordinates identifying a user location and a view angle of the user corresponding to a gaze of a user, wherein the user location represents a virtual location of the user in the geographical area and the view angle represents a virtual view angle of the user in the geographical area;

storing a viewport library comprising a plurality of precomputed viewports, each viewport corresponding to a distinct user location and a user view angle, the storing comprising:
triangulating the geographical area to identify a plurality of triangular areas;
determining one or more viewports corresponding to each triangular area; and
storing the determined one or more viewports in the viewport library as the plurality of precomputed viewports, and wherein each viewport of the plurality of precomputed viewports is computed by:
selecting a subset of sensors from the plurality of sensors based on a measure of distance of each sensor from the user location corresponding to the viewport;
for each sensor from the selected subset of sensors:
identifying a 360-degree video obtained by the sensor; and
extracting a portion of the 360-degree video obtained by the sensor, wherein the portion of video extracted from the 360-degree video is determined based on the view angle of the viewport;

responsive to receiving the user location and the view angle of the user, identifying a nearest stored viewport from the viewport library for sending to the client device of the user;

synthesizing the identified nearest viewport by synthesizing a video from the point of view of the user location corresponding to the identified nearest viewport in the direction of the user view angle corresponding to the identified nearest viewport from the extracted portions of each of the identified 360-degree videos obtained from the subset of sensors selected for the identified nearest viewport, the synthesizing based on one or more techniques comprising: depth/range processing, point cloud generation, mesh generation, and texture mapping; and sending the synthesized viewport to the client device of the user.

22. The computer system of claim 21, wherein the user position is a first user position and the set of coordinates is a first set of coordinates, the subset of sensors is a first subset, the identified nearest viewport is a first viewport, wherein the stored instructions are further for:

receiving, by the server from the client device of the user, a second set of coordinates identifying a second user position responsive to the user moving from the first user position to the second user position;
determining a second subset of the plurality of sensors based on a measure of distance of each sensor from the second user position;
for each of the sensors from the second subset of sensors:
identifying a 360-degree video obtained by the sensor; and
extracting a portion of the 360-degree video, wherein the portion of video extracted is determined based on the view angle of the user;
synthesizing a second viewport representing a video from the point of view of the second location of the user in the direction of the gaze of the user from the extracted portions of each of the identified 360-degree videos obtained from the second subset of sensors, the synthesizing based on one or more techniques comprising: point cloud generation, mesh generation, and texture mapping; and
sending the second synthesized viewport to the client device of the user.

23. The computer system of claim 21, wherein the view angle of the user is a first view angle of the user, the viewport is a first viewport, the identified nearest viewport is a first viewport, wherein the stored instructions are further for:
receiving, by the server from the client device of the user, a second view angle of the user responsive to the user changing the gaze from the first view angle to the second view angle;
for each of the sensors from the subset of sensors:
extracting a new portion of the 360-degree video, wherein the new portion of video extracted is determined based on the second view angle of the user;
synthesizing a second viewport representing a video from the point of view of the location of the user in the direction of the second gaze of the user from the extracted new portions of each of the identified 360-degree videos obtained from the subset of sensors, the synthesizing based on one or more techniques comprising: point cloud generation, mesh generation, and texture mapping; and
sending the second synthesized viewport to the client device of the user.

24. The computer system of claim 21, wherein the server further receives a quality of service measure from the client and determines, wherein the stored instructions are further for:
determining a resolution of the video corresponding to the viewport and sending the video to the client device of the user using the determined resolution.

25. A computer readable non-transitory medium storing instructions for receiving a six degrees of freedom virtual reality experience at a receiver client in a client-server architecture, the instructions for:
determining, by a client device of a user, a set of coordinates identifying a user location and a view angle of the user corresponding to a gaze of a user, the user virtually located in the geographical area;
sending, by the client device to a server, the set of coordinates identifying the user location and the view angle of the user, wherein the server stores:
information identifying an array of sensors distributed over a geographical area, the sensor array comprising plurality of sensors, each sensor configured to capture one or more of a 360-degree video, a range, or audio, each sensor positioned on a distinct location in the geographical area;
a viewport library comprising a plurality of precomputed viewports, each viewport corresponding to a distinct user location and a user view angle and associated with a respective set of sensors representing a subset of the plurality of sensors of the sensor array selected based on a measure of distance of each sensor from the user position of the viewport, wherein the plurality of precomputed viewports are identified by:
triangulating the geographical area to identify a plurality of triangular areas;
determining one or more viewports corresponding to each triangular area; and
storing the determined one or more viewports in the viewport library as the plurality of precomputed viewports;
receiving, by the client device, from the server, point cloud/mesh/texture data based on a set of portions of videos corresponding to the set of sensors associated with a viewport of the plurality of precomputed viewported determined to be nearest to the user location of the user, each of the set of portions of videos extracted from a 360-degree video obtained by a sensor, wherein the portion of video extracted is determined based on the view angle of the identified nearest viewport;
synthesizing, by the client device, the identified nearest viewport by synthesizing a video from the point of view of the location of the user in the direction of the gaze of the user from the extracted portions of each of the identified 360-degree videos obtained from the set of sensors, the synthesizing based on one or more techniques comprising: point cloud generation, mesh generation, and texture mapping; and
displaying, by the client device, the synthesized viewport via a display of the client device.

26. The computer readable non-transitory medium of claim 25, wherein the user position is a first user position and the set of coordinates is a first set of coordinates, the subset of sensors is a first subset, the identified nearest viewport is a first viewport, wherein the stored instructions are further for:
determining, by the client device of a user, a second set of coordinates identifying a second user location responsive to the user moving from the first user position to the second user position;
sending, by the client device to the server, the second set of coordinates identifying the second user location and the second view angle of the user;
receiving, by the client device, from the server, data point cloud/mesh/texture data;
synthesizing, by the client device, a second viewport representing a video from the point of view of the second user location and the second viewing angle; and
displaying, by the client device, the synthesized second viewport via a display of the client device.

27. The computer readable non-transitory medium of claim 25, wherein the view angle of the user is a first view angle of the user, the identified nearest viewport is a first viewport, wherein the stored instructions are further for:
determining, by the client device of a user, a second view angle of the user responsive to the user changing the gaze from the first view angle to the second view angle;
sending, by the server from the client device of the user, a second view angle of the user responsive to the user changing the gaze from the first view angle to the second view angle;

receiving, by the client device, from the server, point cloud/mesh/texture data based on a set of portions of videos, each of the set of portions of videos extracted from a 360-degree video obtained by a sensor;

synthesizing, by the client device, a second viewport representing a video from the point of view of the second user location and the second viewing angle; and displaying, by the client device, the synthesized second viewport via a display of the client device.

28. The computer readable non-transitory medium of claim 25, wherein the server further receives a quality of service measure from the client and determines, wherein the stored instructions are further for:

determining a resolution of the video corresponding to the viewport and sending the video to the client device of the user using the determined resolution.

\* \* \* \* \*